United States Patent
Agarwal et al.

(10) Patent No.: US 12,466,173 B2
(45) Date of Patent: Nov. 11, 2025

(54) FLEXIBLE PROXIMITY SENSORS INCORPORATING NANOCOMPOSITE MATERIALS, METHODS OF PRODUCING THE SAME, AND METHODS OF MEASURING SENSITIVITY OF THE SAME

(71) Applicant: The Trustees of Indiana University, Bloomington, IN (US)

(72) Inventors: Mangilal Agarwal, Carmel, IN (US); Hamid Dalir, Carmel, IN (US)

(73) Assignee: The Trustees of Indiana University, Bloomington, IN (US)

( * ) Notice: Subject to any disclaimer, the term of this patent is extended or adjusted under 35 U.S.C. 154(b) by 820 days.

(21) Appl. No.: 17/773,188

(22) PCT Filed: Oct. 28, 2020

(86) PCT No.: PCT/US2020/057617
§ 371 (c)(1),
(2) Date: Apr. 29, 2022

(87) PCT Pub. No.: WO2021/086887
PCT Pub. Date: May 6, 2021

(65) Prior Publication Data
US 2022/0388297 A1    Dec. 8, 2022

Related U.S. Application Data

(60) Provisional application No. 62/927,181, filed on Oct. 29, 2019.

(51) Int. Cl.
B32B 37/10    (2006.01)
B32B 5/26    (2006.01)
(Continued)

(52) U.S. Cl.
CPC .............. *B32B 37/10* (2013.01); *B32B 5/26* (2013.01); *B32B 7/10* (2013.01); *B32B 27/08* (2013.01);
(Continued)

(58) Field of Classification Search
None
See application file for complete search history.

(56) References Cited

U.S. PATENT DOCUMENTS

| | | | |
|---|---|---|---|
| 2009/0085894 A1* | 4/2009 | Gandhi | G06F 3/0445 345/175 |
| 2011/0132449 A1* | 6/2011 | Ramadas | H10K 59/874 428/419 |
| 2012/0258302 A1 | 10/2012 | Hunt et al. | |

OTHER PUBLICATIONS

International Search Report; International Searching Authority; International Application No. PCT/US2020/057617; Jan. 27, 2021; 2 pages.

(Continued)

*Primary Examiner* — Jeffrey D Washville
(74) *Attorney, Agent, or Firm* — Taft Stettinius & Hollister LLP

(57) ABSTRACT

Sensors, methods of producing sensors, and methods of measuring sensitivities of sensors are disclosed herein. A sensor includes a nanocomposite material having a thermoplastic polyurethane base. A method of producing a sensor includes embedding a plurality of carbon nanotubes into a thermoplastic polyurethane base and diluting a concentration of the plurality of carbon nanotubes embedded into the thermoplastic polyurethane base.

20 Claims, 8 Drawing Sheets

(51) Int. Cl.
- *B32B 7/10* (2006.01)
- *B32B 27/08* (2006.01)
- *B32B 27/40* (2006.01)
- *B32B 37/02* (2006.01)
- *B32B 38/00* (2006.01)

(52) U.S. Cl.
CPC .............. *B32B 27/40* (2013.01); *B32B 37/02* (2013.01); *B32B 38/0004* (2013.01); *B32B 2250/05* (2013.01); *B32B 2250/24* (2013.01); *B32B 2250/44* (2013.01); *B32B 2260/021* (2013.01); *B32B 2260/046* (2013.01); *B32B 2262/106* (2013.01); *B32B 2305/72* (2013.01); *B32B 2307/72* (2013.01); *B32B 2307/732* (2013.01); *B32B 2309/02* (2013.01); *B32B 2309/12* (2013.01); *B32B 2313/04* (2013.01); *B32B 2457/00* (2013.01)

(56) References Cited

OTHER PUBLICATIONS

Written Opinion of the International Searching Authority; International Searching Authority; International Application No. PCT/US2020/057617; Jan. 27, 2021; 12 pages.

Dong et al. Enhanced Solid Particle Erosion Properties of Thermoplastic Polyurethane-Carbon Nanotube Composites, Macromolecular Materials and Engineering, vol. 304, Feb. 27, 2019, pp. 1-11.

Jia et al. Creep of thermoplastic polyurethane reinforced with ozone functionalized carbon nanotubes, eXPRESS Polymer Letters, vol. 6, No. 9, 2012, pp. 750-758.

Ayesh et al. Low percolation threshold of functionalized single-walled carbon nanotubes-polycarbonate nanocomposites, Journal of Reinforced Plastics & Composites, vol. 31, No. 16, Aug. 2012, pp. 1113-1123.

Moheimani et al. Mathematical Model and Experimental Design of Nanocomposite Proximity Sensors, IEEE Access, vol. 8, Aug. 31, 2020, pp. 153087-153097.

* cited by examiner

FLEXIBLE PROXIMITY SENSORS INCORPORATING NANOCOMPOSITE MATERIALS, METHODS OF PRODUCING THE SAME, AND METHODS OF MEASURING SENSITIVITY OF THE SAME

CROSS-REFERENCE TO RELATED APPLICATION

This application is a U.S. National Phase application of International Application No. PCT/US2020/057617, which was filed on Oct. 28, 2020, and which claims priority to, and the benefit of, U.S. Provisional Patent Application Ser. No. 62/927,181 entitled "TPU-CNT Flexible Proximity Sensors," which was filed on Oct. 29, 2019. Those applications are incorporated herein by reference in their entireties.

FIELD OF THE DISCLOSURE

The present disclosure relates, generally, to flexible proximity sensors, and, more specifically, to flexible proximity sensors incorporating nanomaterials and/or nanostructures.

BACKGROUND

Proximity sensors may be classified as ultrasound-based proximity sensors, at least in some cases. Some ultrasound-based proximity sensors require relatively complex hardware to direct operation thereof. The use of such ultrasound-based proximity sensors may therefore be associated with an undesirable degree of complexity. Additionally, that complexity may render some ultrasound-based proximity sensors poorly suited for applications that involve incorporation of the sensors into flexible and portable small devices, such as wearable smart devices and/or electronics, for example.

Proximity sensors may also be classified as capacitive-based proximity sensors. Fabrication of some capacitive-based proximity sensors may be associated with an undesirable degree of expense and complexity. Moreover, some capacitive-based proximity sensors may provide limited precision and/or accuracy in distance detection. Like some ultrasound-based proximity sensors, some capacitive-based proximity sensors may be poorly suited for applications that involve incorporation of the sensors into flexible and portable small devices. Silicon-based proximity sensors, for instance, may be too brittle to withstand large deformations and therefore generally impracticable for incorporation into flexible and portable small devices.

Proximity sensors that address the aforementioned drawbacks and are well suited for incorporation into flexible and portable small devices remain an area of interest.

SUMMARY

The present disclosure may comprise one or more of the following features and combinations thereof.

According to one aspect of the present disclosure, a sensor may include a nanocomposite material. The nanocomposite material may have a thermoplastic polyurethane base and a plurality of carbon nanotubes embedded into the thermoplastic polyurethane base.

In some embodiments, the nanocomposite material may include a plurality of epoxy resin fibers.

In some embodiments, each of the plurality of carbon nanotubes may have a length of from 1400 nanometers to 1800 nanometers.

In some embodiments, each of the plurality of carbon nanotubes may have a diameter of from 5 nanometers to 10 nanometers.

In some embodiments, the plurality of carbon nanotubes may be present in the nanocomposite material in a concentration of from 1% by weight to 5% by weight.

In some embodiments, the plurality of carbon nanotubes may be present in the nanocomposite material in a concentration of 1% by weight.

In some embodiments, the plurality of carbon nanotubes may be present in the nanocomposite material in a concentration of 2% by weight.

In some embodiments, the plurality of carbon nanotubes may be present in the nanocomposite material in a concentration of 3% by weight.

In some embodiments, the plurality of carbon nanotubes may be present in the nanocomposite material in a concentration of 4% by weight.

In some embodiments, the plurality of carbon nanotubes may be present in the nanocomposite material in a concentration of 5% by weight.

In some embodiments, in use thereof, the sensor may detect proximity of a sensed object over a distance of 220 mm with a resolution of 0.1 mm.

In some embodiments, the sensor may be a capacitive-based proximity sensor.

According to another aspect of the present disclosure, a sensor may include multiple layers of nanocomposite material. Each layer of nanocomposite material may have a thermoplastic polyurethane base and a plurality of carbon nanotubes embedded into the thermoplastic polyurethane base. The multiple layers of nanocomposite material may include a first layer of nanocomposite material having a first thickness and a second layer of nanocomposite material having a second thickness different from the first thickness.

In some embodiments, each layer of nanocomposite material may include a plurality of epoxy resin fibers.

In some embodiments, the plurality of carbon nanotubes may be present in each layer of the multiple layers of nanocomposite material in a concentration of from 1% by weight to 5% by weight per layer.

In some embodiments, in use thereof, the sensor may detect proximity of a sensed object over a distance of 220 mm with a resolution of 0.1 mm.

In some embodiments, the first layer of nanocomposite material may have a first width and a first length and the second layer of nanocomposite material may have a second width different from the first width and a second length different from the first length.

In some embodiments, the plurality of carbon nanotubes may be present in the first layer of nanocomposite material in a concentration of 1% by weight, and the plurality of carbon nanotubes may be present in the second layer of nanocomposite material in a concentration of 1% by weight.

In some embodiments, the plurality of carbon nanotubes may be present in the first layer of nanocomposite material in a concentration of 1% by weight, and the plurality of carbon nanotubes may be present in the second layer of nanocomposite material in a concentration of 2% by weight.

In some embodiments, the plurality of carbon nanotubes may be present in the first layer of nanocomposite material in a concentration of 1% by weight, and the plurality of carbon nanotubes may be present in the second layer of nanocomposite material in a concentration of 3% by weight.

In some embodiments, the plurality of carbon nanotubes may be present in the first layer of nanocomposite material in a concentration of 1% by weight, and the plurality of carbon nanotubes may be present in the second layer of nanocomposite material in a concentration of 4% by weight.

In some embodiments, the plurality of carbon nanotubes may be present in the first layer of nanocomposite material in a concentration of 1% by weight, and the plurality of carbon nanotubes may be present in the second layer of nanocomposite material in a concentration of 5% by weight.

According to yet another aspect of the present disclosure, a method of producing a sensor may include embedding a plurality of carbon nanotubes into a thermoplastic polyurethane base and diluting a concentration of the plurality of carbon nanotubes embedded into the thermoplastic polyurethane base to obtain a diluted concentration of carbon nanotubes that is from 1% by weight to 5% by weight.

In some embodiments, the method may include extruding the plurality of carbon nanotubes and the thermoplastic polyurethane base to obtain a plurality of nanocomposite filaments.

In some embodiments, the method may include cutting the plurality of nanocomposite filaments to obtain a plurality of pellets.

In some embodiments, the method may include compressing the pellets and heating the pellets to obtain a plurality of processed nanocomposite layers.

In some embodiments, at least one of the plurality of processed nanocomposite layers may have a thickness from 0.5 mm to 0.7 mm.

In some embodiments, compressing the pellets and heating the pellets may include compressing the pellets in a hot press machine at 2.25 metric tons and heating the pellets gradually up to 200° C.

In some embodiments, the method may include combining at least two layers of the plurality of processed nanocomposite layers to produce the sensor.

In some embodiments, the at least two layers of the plurality of processed nanocomposite layers may differ from one another in size and/or shape.

According to yet another aspect of the present disclosure still, a method of measuring sensitivity of a sensor may include producing the sensor and measuring variations in capacitance of the sensor in response to movement of a target object relative to the sensor. Producing the sensor may include embedding a plurality of carbon nanotubes into a thermoplastic polyurethane base and diluting a concentration of the plurality of carbon nanotubes embedded into the thermoplastic polyurethane base to obtain a diluted concentration of carbon nanotubes that is from 1% by weight to 5% by weight.

In some embodiments, measuring variations in capacitance of the sensor may include applying a reference voltage to the sensor.

In some embodiments, applying the reference voltage to the sensor may include applying 30 mV to the sensor.

In some embodiments, measuring variations in capacitance of the sensor may include moving the target object relative to the sensor at a reference speed.

In some embodiments, moving the target object relative to the sensor at the reference speed may include moving the target object relative to the sensor at 0.66 mm/s.

In some embodiments, measuring variations in capacitance of the sensor may include measuring variations in capacitance of the sensor using a semiconductor characterization system.

In some embodiments, the method may include detecting a proximity of the target object to the sensor over a distance of 220 mm at a resolution of 0.1 mm.

In some embodiments, producing the sensor may include extruding the plurality of carbon nanotubes and the thermoplastic polyurethane base to obtain a plurality of nanocomposite filaments.

In some embodiments, producing the sensor may include cutting the plurality of nanocomposite filaments to obtain a plurality of pellets, compressing the pellets and heating the pellets to obtain a plurality of processed nanocomposite layers, and combining at least two layers of the plurality of processed nanocomposite layers to produce the sensor.

In some embodiments, the at least two layers of the plurality of processed nanocomposite layers may differ from one another in size and/or shape.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1A:
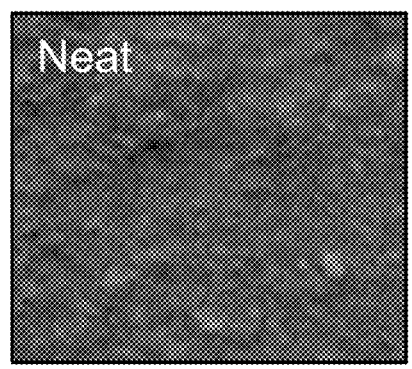
FIG. 1A illustrates a scanning electron microscope (SEM) image of a cross-section of a fracture surface of a thermoplastic polyurethane (TPU) article.
Figure 1B:
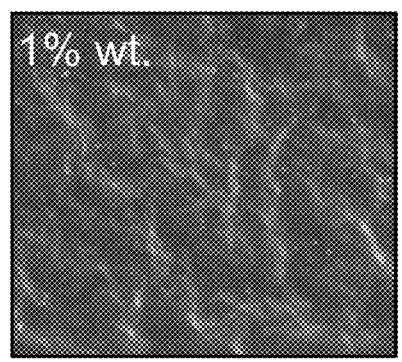
FIG. 1B illustrates a SEM image of a cross-section of a fracture surface of a thermoplastic polyurethane (TPU)—carbon nanotube (CNT) composite having a 1% CNT concentration.
Figure 1C:
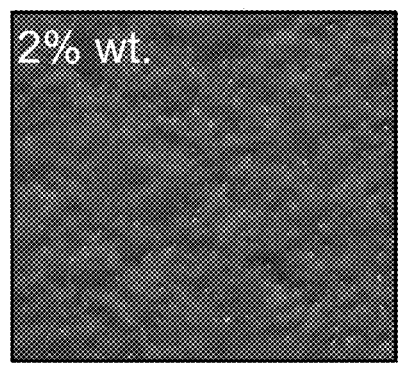
FIG. 1C illustrates a SEM image of a cross-section of a fracture surface of a thermoplastic TPU-CNT composite having a 2% CNT concentration.
Figure 1D:
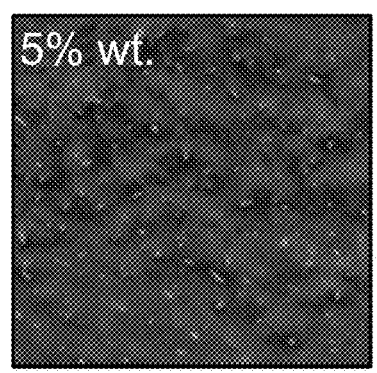
FIG. 1D illustrates a SEM image of a cross-section of a fracture surface of a thermoplastic TPU-CNT composite having a 5% CNT concentration.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

The present disclosures relates to nanocomposite sensors that have characteristics of capacitive-based proximity sensors and are uniquely suited for incorporation into one or more wearable smart devices. Due at least in part to a semi-conductive nanostructure thereof, the flexible and ultralight proximity sensors of the present disclosure have a considerably simpler structure than proximity sensors having other configurations. In the illustrative embodiment, as further described below, the proximity sensors of the present disclosure are fabricated from a thermoplastic polyurethane (TPU) polymer in which carbon nanotubes (CNTs) are embedded. The polymeric nanocomposite structures contemplated by the present disclosure are flexible and durable such that the sensors incorporating those structures are suitable for advanced manufacturing applications, three-dimensional printing applications, and integration with flexible electronics.

At least in some embodiments, the sensors of the present disclosure may be made by mixing nanomaterials with epoxy resin. The sensors disclosed herein are capable of detecting objects over a wide range of proximities and frequencies and may provide low-cost alternatives to proximity sensors having other configurations. Compared to other proximity sensors, the proximity sensors contemplated by the present disclosure may offer a number of advantageous characteristics, such as improved durability, reduced weight, reduced power consumption, and improved manufacturability, among other things.

Sensors incorporating TPU-CNT composite materials as contemplated herein are not resistive strain detectors. In strain sensors, it should be appreciated that the direct current (DC) properties of nanocomposite materials are significant. In contrast, for applications associated with electromagnetic interference of various materials, the alternating current (AC) properties of nanocomposite materials are significant. Experimental studies conducted on the electrical properties of nanocomposites including insulating polymers filled with or encapsulating CNTs may measure proximity based on the capacity change of TPU-CNT composites.

The unique proximity sensors of the present disclosure are capable of detecting objects with resolution of 100 microns, at least in some embodiments. The proximity sensors of the present disclosure provide ultrasensitive detection of the presence of objects and thereby are uniquely suited for application to healthcare systems including wearable proximity sensors for motion analysis and artificial intelligence. The proximity sensors contemplated herein may be integrated in numerous devices, such as wearable gadgets, health monitoring devices, portable electronics, automotive parts, and aerospace parts, just to name a few. Construction of the proximity sensors of the present disclosure with TPU facilitates flexion of the proximity sensors and continuous extrusion with CNTs.

Carbon nanotubes (CNTs) are cylindrical carbon molecules suited for use in a wide variety of applications (e.g., nano-electronics, optics, materials applications, etc.) due to their unique properties. CNTs typically exhibit very high strength and distinctive electrical properties. In addition, CNTs are often efficient conductors of heat. Some carbon-containing nanocomposites, such as epoxy-based nanocomposites, for example, may be particularly well adapted for use in aerospace, automotive, and motorsports applications as a result of their desirable mechanical properties.

In some embodiments, the carbon nanotubes may have a length of from about 1200 nanometers to about 2000 nanometers. In some embodiments still, the carbon nanotubes may have a length of from about 1400 nanometers to about 1800 nanometers. In some embodiments yet still, the carbon nanotubes may have a diameter of from about 4 nanometers to about 15 nanometers. Further, in some embodiments, the carbon nanotubes may have a diameter of from about 5 nanometers to about 10 nanometers.

In some embodiments, a thermoplastic resin fiber of the present disclosure may include a plurality of nanomaterials, such as carbon nanotubes (CNTs), for example. In such embodiments, the thermoplastic resin fiber may be incorporated into, or otherwise form a portion of, an epoxy resin. Additionally, in such embodiments, the plurality of nanomaterials may include nanowires, nanoparticles, gold nanoparticles, graphene, or other suitable nanomaterials.

In some embodiments, the nanomaterials may be substantially aligned in substantially the same orientation as other nanomaterials (e.g., nanotubes) in the fiber. Additionally, in some embodiments, the nanomaterials may be all carbon nanotubes. In other embodiments, the nanomaterials may include both carbon nanotubes and non-carbon nanotubes.

In one aspect, the present disclosure is directed to a prepreg material including fibers and at least one polymer material coated, impregnated, and/or embedded with a thermoplastic resin fiber having a plurality of nanomaterials. In some embodiments, the coating and/or impregnation is achieved by electrospinning. Of course, in other embodiments, it should be appreciated that the coating and/or impregnation may be performed by other suitable techniques, such as by spray coating and blade painting, for example.

As used herein, the term "nanostructure" refers to an elongated chemical structure having a diameter on the order of nanometers and a length on the order of microns to millimeters, at least in some embodiments. In such embodiments, each nanostructure may have an aspect ratio greater than 10, greater than 100, greater than 1000, or greater than 10,000. In some cases, the nanostructure may have a diameter less than 1 μm, less than 100 nm, less than 50 nm, less than 25 nm, or less than 10 nm. Additionally, in some cases, the nanostructure may have a diameter less than 1 nm. Typically, the nanostructure may have a cylindrical or pseudo-cylindrical shape. In some embodiments, the nanostructure may be a nanotube, such as a carbon nanotube.

It should be appreciated that the nanostructures described herein may be uniformly dispersed within various matrix materials, which may facilitate formation of composite structures having improved mechanical, thermal, electrical, or other properties, among other things. Methods contemplated by the present disclosure may also allow for continuous and scalable production of nanostructures, such as nanotubes, nanowires, nanofibers, and the like, for example, on moving substrates, at least in some cases.

In some embodiments, substrates described herein may be prepregs. That is, the substrates may include a polymer material (e.g., a thermoplastic polymer) containing embedded, aligned, and/or interlaced (e.g., woven or braided) fibers such as carbon fibers. As used herein, the term "prepreg" refers to one or more layers of thermoplastic resin containing embedded fibers, such as fibers of carbon, glass, silicon carbide, and the like, for example.

Figure 5A:
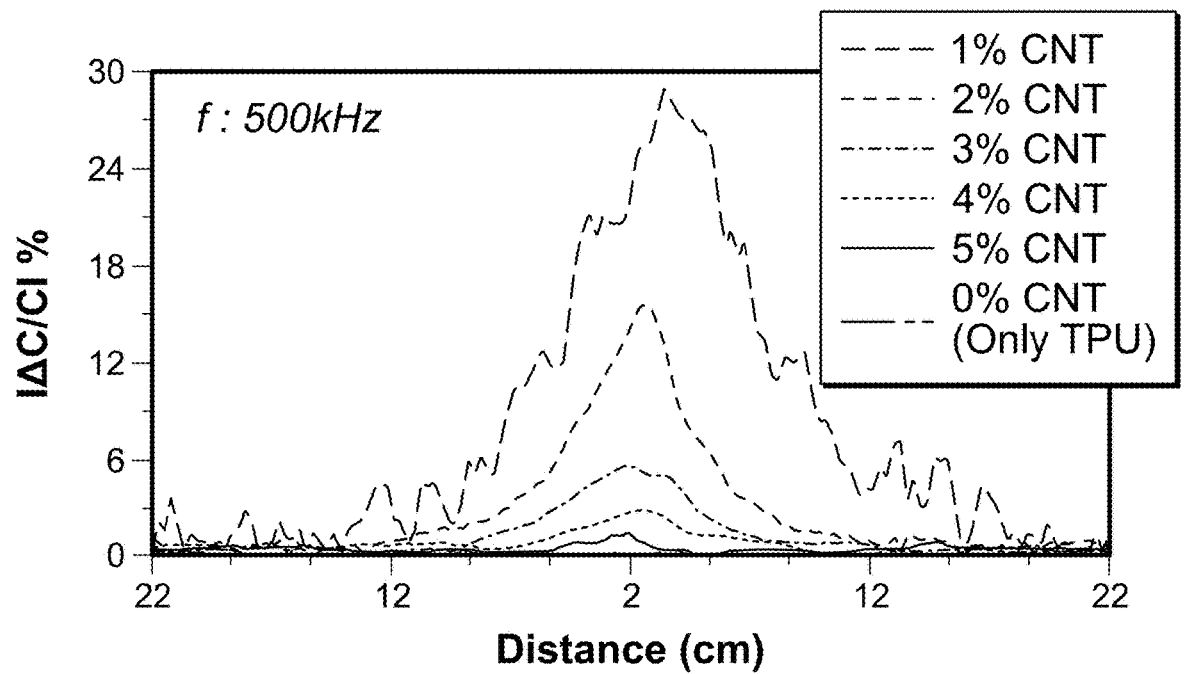
FIG. 5A illustrates a graphical representation of proximity detection of sensors having different TPU-CNT concentrations.

In the illustrative embodiment, TPU filaments containing multi-walled carbon nanotubes (MWCNTs) in concentrations of 1 wt. %, 2 wt. %, 3 wt. %, 4 wt. %, and 5 wt. % (e.g., as illustrated in FIG. 5A) were produced by selectively diluting a 5 wt. % masterbatch of TPU/MWCNT. The filaments were obtained by melt-mixing with a 16 mm twin-screw extruder to achieve a uniform distribution of CNTs. Pellets of TPU-CNTs were then cut and subsequently processed via a hot-pressing technique. More specifically, the pellets were compressed in a hot press machine at 2.25 metric tons and heated up gradually to 200° C. Thereafter, capacitance changes of the hot-pressed TPU-CNT nanocomposites were measured on 60 mm×20 mm square samples each having a thickness ranging from 0.5 mm to 0.7 mm.

FIGS. IA-1D depict the formation of CNTs inside the TPU polymer structure. The distribution of the CNTs inside the polymer structure is generally uniform in each of FIGS. 1A-1D. In some embodiments, the CNTs may be dispersed uniformly throughout at least 10% of the TPU polymer structure. Additionally, in some embodiments, the CNTs may be uniformly dispersed throughout at least 20%, at least 30%, at least 40%, at least 50%, at least 60%, at least 70%, at least 80%, at least 90%, at least 95%, or 100% of the TPU polymer structure. In one example, the description of "dispersed uniformly throughout at least 10% of the TPU polymer structure" refers to the substantially uniform arrangement of CNTs over at least 10% of the area of the TPU polymer structure. That is, in that particular example, the CNTs are primarily arranged uniformly over at least 10% of the area of the polymer structure, rather than in a heterogeneous arrangement of bundles or pellets.

Figure 2A:
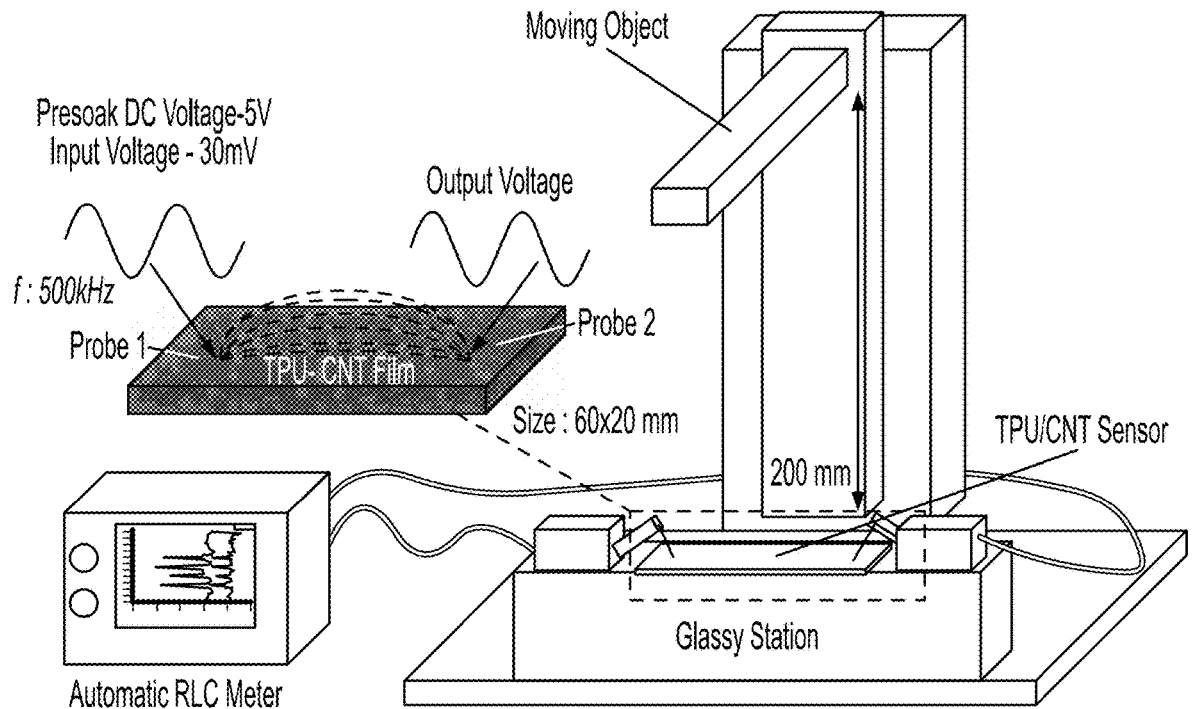
FIG. 2A illustrates a schematic of a a testing setup adapted for testing the TPU-CNT composites of the present disclosure.

Object proximity testing of the TPU/CNT nanocomposite sensor over a range of from about 20 mm to 220 mm was performed using a portable testing station as exemplified in FIG. 2A. A predetermined voltage over various frequencies was applied to at least one presoaked TPU-CNT nanocomposite sample using a pair of probes. In some embodiments, the predetermined voltage may be embodied as, or otherwise include, an alternating current (AC) charge of 30 mV. In any case, during testing, the sensed object advanced toward and/or relative to the at least one TPU-CNT sample at a speed of 0.66 mm/s. In the illustrative embodiment, the sensed object is embodied as, or otherwise includes, a brass bar. Of course, in other embodiments, another suitable object may be employed as a sensed object.

Capacitance changes of the at least one TPU-CNT sample during movement of the sensed object relative to the sample were illustratively measured using a Keithley Model 4200-SCS semiconductor characterization system. Of course, in other embodiments, another suitable measurement device may be utilized. Regardless, in the illustrative setup, one probe received the predetermined voltage and the other probe was grounded. During testing, reproducibility, repeatability, and sensitivity of the at least one TPU-CNT nanocomposite sensor sample were evaluated and validated by simulation in the testing setup depicted in FIG. 2A. For the purposes of the present disclosure, performance and/or behavioral characteristics of the sensor were hypothesized, or otherwise developed, based on fringe capacitance and tunneling networks.

At least in some embodiments, a proximity sensor of the present disclosure is embodied as, or otherwise includes, one or more TPU-CNT samples (e.g., in the form of a sheet, a strip, a coupon, a square, a film, a layer or the like) having different shapes and sizes. In such embodiments, when the proximity of the sensed object changes relative to the sensor over the course of movement of the sensed object relative to the sensor, the capacitance of the one or more TPU-CNT samples varies accordingly. An electrical circuit equivalent to and/or simulated by the testing setup described above is depicted in FIG. 3.

A TPU-CNT composite proximity sensor of the present disclosure exhibits proximity detection over a distance of 220 mm with a resolution of 0.1 mm. The performance of the proximity sensors of the present disclosure may be superior to performance of proximity sensors having other configurations. The relatively straightforward architecture and fabrication of the proximity sensors contemplated by the present disclosure demonstrate robustness to repeated cycling and repeated testing. Fringe capacitance effects of the structures associated with the proximity sensors disclosed herein were simulated and validated by experiment.

Figure 4:
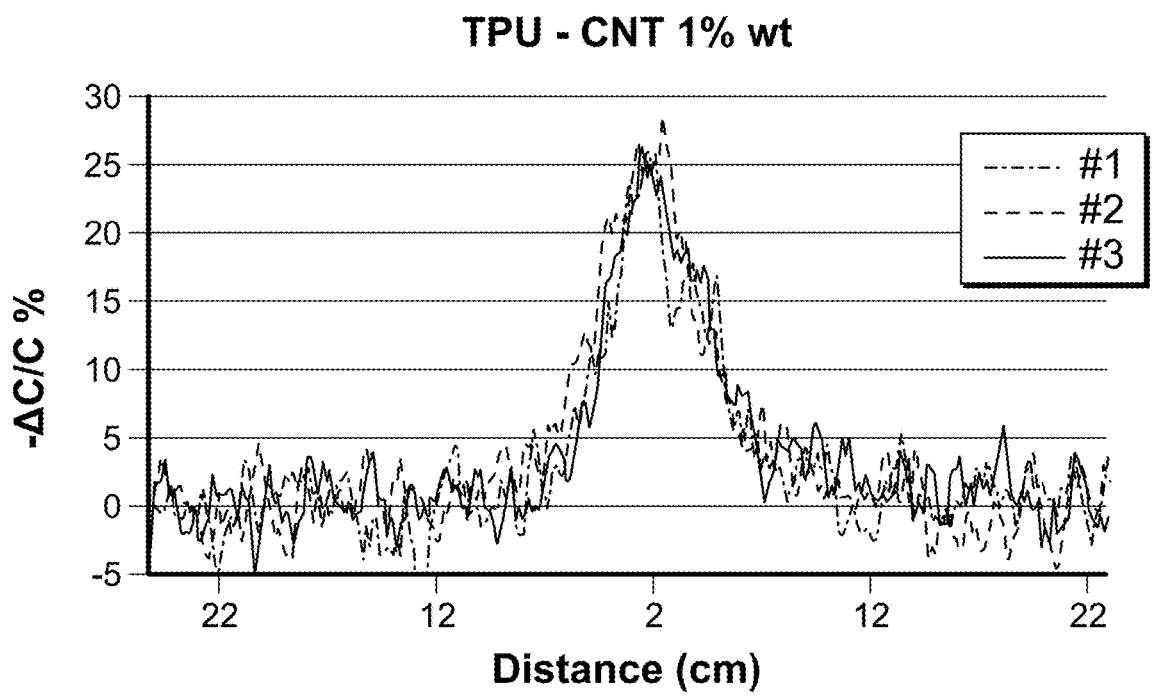
FIG. 4 illustrates a graphical representation of proximity detection of a sensor having a 1% TPU-CNT concentration.
Figure 5B:
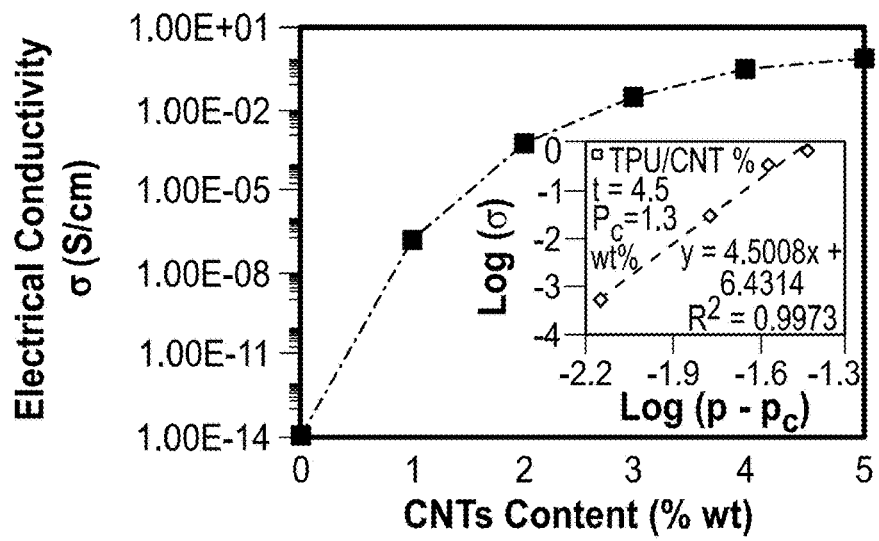
FIG. 5B illustrates a graphical representation of electrical conductivity of TPU-CNT samples vs. CNT content wt. %.

A proximity sensor having a CNT concentration of 1 wt. % demonstrates the highest proximity detection peak of the CNT concentrations of 1 wt. %, 2 wt. %, 3 wt. %, 4 wt. %, and 5 wt. % depicted in FIG. 5A. Proximity detection of a sensor having a TPU-CNT concentration of 1 wt. % is depicted in FIG. 4 over a number of cycles. As suggested by FIGS. 5A and 5B, a sensor having a CNT concentration of 2 wt. % has less fluctuation and greater similarity between cycles than sensors having other CNT concentrations. Additionally, as suggested by FIG. 5A, diminished sensor sensitivity is associated with increased embedded CNT content in the sensors. Notably, sensors having CNT concentrations of 4 wt. % and 5 wt. % do not appear to indicate any significant sensitivity. As mentioned above, the reproducibility of the samples having different CNT concentrations are compared in FIG. 5A. The results indicate the sensors experience substantially no degradation over repeated cycling and repeated testing.

It should be appreciated that the proximity sensors envisioned by the present disclosure may be embodied as, or otherwise include, any device incorporating TPU-CNT nanocomposite materials and/or nanostructures as described herein that is capable of measurement of a characteristic of interest. In some embodiments, the characteristic of interest may be proximity and/or distance. In some embodiments still, the characteristic of interest may be a physical, chemical, biological, or environmental parameter. It should also be appreciated that in some embodiments, the sensors contemplated by the present disclosure may be embodied as, or otherwise include, one or more biosensors, nanosensors, metal-oxide-semiconductor (MOS) sensors, or the like.

In some embodiments, the proximity sensors of the present disclosure may each be included in, or otherwise adapted for use with, a control system including a processor and a memory device. The processor may be embodied as, or otherwise include, any type of processor, controller, or other compute circuit capable of performing various tasks such as compute functions and/or controlling the functions of the device for which the control system is provided. The processor may be embodied as a single or multi-core processor(s), a microcontroller, or other processor or processing/controlling circuit. In some embodiments, the processor may be embodied as, include, or otherwise be coupled to an FPGA, an application specific integrated circuit (ASIC), reconfigurable hardware or hardware circuitry, or other specialized hardware to facilitate performance of one or more functions of the particular device. Additionally, in some embodiments, the processor may be embodied as, or otherwise include, a high-power processor, an accelerator co-processor, or a storage controller.

The memory device of the control system may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device of the control system may be embodied as a block addressable memory, such as those based on NAND or NOR technologies. The memory device may also include future generation nonvolatile devices, such as a three dimensional crosspoint memory device (e.g., Intel 3D XPoint™ memory), or other byte addressable write-in-place nonvolatile memory devices. In some embodiments, the memory device may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

Wearable sensing platforms have been rapidly advanced over recent years, thanks to numerous achievements in a variety of sensor fabrication techniques. However, the development of a flexible proximity sensor that can perform in a large range of object mobility remains a challenge. In the present disclosure, a polymer-based sensor that utilizes a nanostructure composite as the sensing element has been presented for forthcoming usage in healthcare and automotive applications. Thermoplastic Polyurethane (TPU)/Carbon Nanotubes (CNTs) composites are capable of detecting presence of an external object in a wide range of distance. The proximity sensor exhibits an unprecedented detection distance of 120 mm with a resolution of 0.3%/mm. The architecture and manufacturing procedures of TPU/CNTs sensor are straightforward and performance of the proximity sensor shows robustness to reproducibility as well as excellent electrical and mechanical flexibility under different bending radii and over hundreds of bending cycles with variation of 4.7% and 4.2%, respectively. Tunneling and fringing effects are addressed as the sensing mechanism to explain significant capacitance changes. Percolation threshold analysis of different TPU/CNT contents indicated that nanocomposites having 2 wt % carbon nanotubes are exhibiting excellent sensing capabilities to achieve maximum detection accuracy and least noise among others. Fringing capacitance effect of the structure has been systematically analyzed by ANSYS Maxwell (Ansoft) simulation, as the experiments precisely supports the sensitivity trend in simulation. Our results introduce a new mainstream platform to realize an ultrasensitive perception of objects, presenting a promising prototype for application in wearable proximity sensors for motion analysis and artificial electronic skin.

Electronic technologies including sensors are one of the key components in smart devices. Flexible sensors have been highly explored recently for incorporation into textiles or for direct connection to the body of a human/robot for wearable smart devices [1-6] and human robotic systems [7-9]. Furthermore, flexible sensors can be implemented as artificial skin and medical prosthetic, chiefly delivering a sensing interface while transmitting information to prevent from damage between human beings and robots as well as the nature [10-12]. Multiple flexible or stretchable sensors have been developed by Micro-electro-mechanical system (MEMS) micromachining techniques for different purposes. For instance, strain sensors [13-15] can detect body motion, tactile sensors [16-22] enable to monitor three-axis handling/manipulation of objects, while proximity sensors [20, 21, 23, 24] avoid any possible accident of humans and robots to unknown obstacles. Among them, proximity sensors are extremely appealing candidates for nondestructive realizing of collision prevention in industry. Thereafter, it is necessary to be able to detect the presence of the object without making contact. To benefit the contactless measurement, studies have been extended on integration and incorporation of proximity sensing function in many electronic platforms. A proximity sensor often looks for the change in the field of either electromagnetic or electrostatic, whose sensing techniques are such as ultrasonic, optical, magnetic induction, and capacitive measurement [25-29]. Capacitive proximity sensors (CPSs) have been widely deployed for their advantages over other sensors thanks to their lightweight, relatively economical, fast detection of a wide range of materials, and readily embedded on both flat and curved working substrates (flexible and variable structure design). To date, the reported target objects for capacitive proximity sensors have been restricted to human finger and conductors, with limited distance resolution [30, 31]. These sensors are typically based on metal and silicon substrates in a simple printed circuit board (PCB), constituting a number of circuits and complex layered matrix arrays. Other limitations are addressed such as being too brittle to endure large deformation and not flexible enough to cover curved surfaces. Therefore, flexible and conductive materials are required in CPSs. Accordingly, sensor dielectric layer is required to be fabricated using various electronically conducting polymers, elastomers with low modulus, such as poly ethylene terephthalate (PET), Polyimide (PI), or Polydimethlysiloxane (PDMS)[32-34].

TABLE 1

Review of main characteristics of flexible capacitance-type proximity sensors reinforced by nanomaterials

| Active materials & Substrate | Sensitivity $\left[\% \frac{\Delta C}{C_0} \text{ mm}^{-1}\right]$ | Response time (1 pF) | Resolution | Size/shape (area) | Operational range | Other industrial features |
|---|---|---|---|---|---|---|
| [30]Graphene/PET/acrylic PET (mesh-structured) Graphene (electrodes) Acrylic polymer (dielectric layer) | 0.67 (Iron) 0.11 (Finger) | <60 ms | 5 mm | 4 × 6 cm$^2$ 8 × 8 array (64 channels) Thickness 0.03 mm | 10 mm (Iron) 70 mm (Finger) | Touch sensing Searchability~8-15% ($r_b$ = 1.5 mm) |
| [23, 38, 40]PDMS/ AgNWs/PET PDMS (dielectric layer) AgNWS (electrodes) | 0.06-0.12 (Finger) | <40 ms | 5 mm | 2.5 × 7.5 cm$^2$ Thickness 1 mm | 90-140 mm | All pressure sensing Reversibility [38, 40] (up to 100 kPa) & [38](50% strain) [40]Durability (200 cycles for 100 kPa) [23]Stability (2 hrs) [23]Bending stability (300 cycles & $r_b$ = 30 mm) |
| [49, 50]CMC/MWCNT/ silicone CMC (elastomer composite sheet) | 0.10 (Copper) | — | 2 mm | 3.2 × 3.2 cm$^2$ FPCB electrode layer Thickness 0.6 mm | 60 mm | Inductive and capacitive sensing modes [50]Repeatable & reversibility (5 cycles) [50]Durability (3000 cycles for 150 kPa) CMC (0%-1.5%-3%-5%-8%) Maximum detection 1.5% [49] and 8% [50] |
| [51]CNC/m-rGO/epoxy GO (conducting particles) | 7.8 (Finger) zero (Copper & Plastic rod) | — | 0.5 mm | 2 × 1 cm$^2$ Thickness 0.16 mm | 6 mm | Touch sensor Durability (100 cycles at the distance of 0.2 mm) Good stability, high reproducibility Suitable recovery time (3 second) |

PET: Ultrathin Polyethylene Terephthalate,
FPCB: flexible printed circuit board,
CNC: cellulose nanocrystal,
GO: Graphene Oxide,
PDMS: polydimethylsiloxane,
AgNWs: silver nanowires,
CMC: carbon microcoils,
MWCNT: multiwall carbon nanotube,
ms: millisecond These flexible polymers are frequently proposed as the composites substrates for preparation of resistive and capacitive sensors/arrays [35-39]. Furthermore, the development of flexible conductive electrodes is reported to be essential for increasing the sensitivity of flexible capacitive sensors. Accordingly, metal nanowires/nanoparticles [23, 38, 40, 41], carbon nanotubes CNTs [42-47], and graphene [30, 48] have been widely explored as the conductive layers/electrodes. Although metal interdigitated electrodes have been designed and engineered on polymer substrates to employ flexible capacitive micro-sensors, interfacial adhesion between the metal electrodes, polymer and electrode on the film are reported to be very challenging [32].[40]

Among the three dominant emerging nanoscale materials addressed in the literature, CNTs, as active sensing elements, have been the center of attention as an alternative to conventional materials because they have remarkable interfacial, mechanical and electrical properties [52-55]. For instance, elastomer composites with incorporation of CNTs show great potential with promising features for electronic device platforms[42, 56]. Recently, vertically aligned CNTs (VACNTs) have been modeled as interdigitated electrodes on a silicon substrate for capacitive sensing [57]. CNTs have also been utilized as the sensing nanofillers for providing conductive polymer composites, which can eliminate the possible interfacial adhesion issues and crack propagation problems of metal film layers patterned on polymer substrates [33]. Different processes have been typically employed to fabricate CNT—polymer nanocomposites sensors, such as mechanical stirring, vacuum filtration, nanoimprint lithography and inkjet printing[55]; however, shaping CNTs in an uniform line pattern as sensing elements are reported to be very complex by these methods [58, 59]. Although CNT can provide unique properties to a polymeric structure, it is still a challenge to integrate CNTs within the structure for further applications [60-62]. Furthermore, numerous processes of polymer micromachining have been newly developed to employ in polymer-based flexible sensors [63, 64].

On the other side, most measurements in CNT-based capacitive sensor industry are being focused on a deformation-based nature (pressure/strain sensors); however, this disclosure intends to investigate more on proximity distance measurement. To benefit the contactless measurement, a couple of studies have been carried out on incorporation of nanofiller based proximity sensing function to the applications for other types of sensors like, tactile, pressure and strain sensors [23, 49-51, 65-67], becoming an increasing prevalence in wearable electronics. The details of main features of recent capacitive proximity sensors (CPSs) deposited on different flexible polymeric substrates with nanostructured particles/fillers are discussed in the Table 1. As indicated, there are only very few numbers of flexible nanocomposite polymeric CPSs with a large range of detection.

This disclosure offers an innovative capacitive proximity sensor enabling sensing objects within a wide range. The nanocomposite ultrasensitive proximity sensor has a simple nanostructure compared with previous studies, but with complex microstructure in which CNTs are melt-mixed in the mold substrate thermoplastic polyurethane (TPU). For the first time, the effect of CNT content is studied on the proximity sensitivity of the flexible capacitive sensor. The sensitivity distribution of the sensor is simulated with Finite Element Modeling (FEM) electrostatic simulation software, and thus, voltage distribution and capacitance reduction behavior are also being examined in the following experiments. The current proximity sensor leaps ahead of the currently used CPSs with their limited sensing distance and provides users with a direct, quick, and easy manufacturing way to interact based on electromechanical principles.

Materials and Methods

Materials Preparation

Figure 2B:
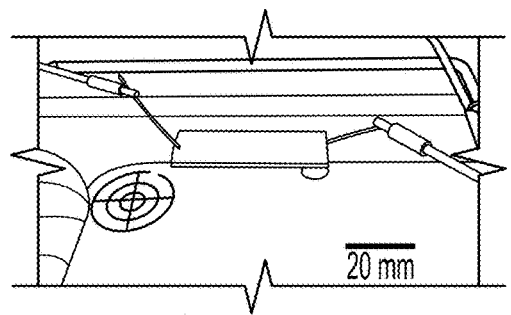
FIG. 2B illustrates an exemplary TPU-CNT composite product and sensor probes used to test the product.
Figure 2C:
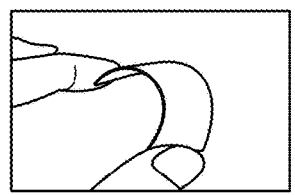
FIG. 2C illustrates a flexible film sensor.

TPU and MWCNT were used as the constituents of the nanocomposite sensors. TPU (Elastollan 1185A polyurethane, with a density of 1.12 g/cm3) and TPU/MWCNT masterbatch (A 5 wt % of TPU/MWCNT contains NC7000 MWCNT with 90% purity, having an average diameter and length of a single CNT, 9.5 nm and 1.5 µm, respectively) were ordered and mixed for different dilution of CNTs. In this work, the content of CNTs filament was produced and varied from 1 wt % to 5 wt % MWCNT by diluting a 5 wt % masterbatch of TPU/MWCNT with pure TPU through a 16 mm twin-screw extruder with L/D ratio of 40 (FilaFab PRO 350 EX, D3D Innovations Limited, UK). To obtain TPU-CNT films with 0.5 mm thickness, pellets of TPU-CNT were then cut from filaments and later compression-molded in a hot press machine (Carver Inc., Wabash, Indiana) at a pressure of 5 MPa at 190° C. for 60 seconds. The films were cooled down to the room temperature and utilized to fabricate the sensors and for characterizations. Samples were cut from the films in 60×20 mm squares. FIG. 2 depicts the final product (image (b)) and the flexibility of the film sensor (image (c)) along with the experiment setup (image (a)).

Proximity Measurements and Sensor Readout

Distances ranging from 20 to 220 mm were applied by using a probing station (Keithley 4200-SCS, Tektronix, USA). The TPU-CNT film was fixed over a glass substrate to eliminate noise and the sensing object (brass bar-10 mm (height)×20 mm (width)×200 mm (length)) started approaching the sample with a speed of 6.6 mm/s after 60 s. Samples were dried in an oven at 60 C for 10 h before testing. The impedance analysis was performed by the modular instrumentation using a probing station. To detect the maximum change in the capacitance, the samples were pre-soaked with 5V direct current (DC) to saturate and reduce the tunneling effect and also to polarize the polymer and form the surface charge. Furthermore, a 30 mv alternate current (AC) swiping signal was applied to measure the capacitance of the film with varying frequencies to achieve maximum stability of the working window for the fabricated sensors. As demonstrated in FIG. 2, the experimental setup and how change of capacitance to the initial capacitance ($\Delta C/C_0$) were analyzed. The sensor probes were mechanically co-planner with an angle of 45 degree to eliminate the noise and reduce the penetration depth inside the film. The entire three set of tests were done for each CNT content. Other conditions, including temperature and humidity, were strictly controlled to obtain a precise measurement.

Electrical Testing

To investigate the percolation behavior of the bulk TPU/CNTs nanocomposites, the in-plane conductivity of hot-pressed nanocomposites was measured on 60 mm by 20 mm square samples with 0.5 mm thickness. The narrow strip of two ends of samples were then coated with conductive silver adhesive to erase the influence of contact resistance, and then the bulk electrical resistivity was calculated by measuring the resistance using Keithley 2400 4-probes. Electrical conductivity of each sample is being calculated by using the equation $\sigma = L/RS$, where $\sigma$ is the volume conductivity, $R$ is the volume resistance, $S$ is the cross-section area of the strip, and $L$ is the length between the electrodes.

Finite Element Analysis 3D and Finite Element Modeling were performed using electromagnetic field simulation software (Ansys Maxwell 2018). Material properties with affiliated modules including relative permittivity and bulk conductivity of 2 wt %. TPU/CNT sample were experimentally measured and assigned to the software. Furthermore, boundary conditions, vacuum domain (15 cm×10 cm×10 cm) and excitation (i.e. applied voltages) are implemented, accordingly. Electric field streamlines in the vacuum domain on the symmetric plane passed through, where a voltage difference of 5V is applied between the two probes of tungsten (the driving and the sensing electrodes). Maximum length of the element with an efficient computational time was optimized about 1 mm. Regarding mesh objectivity, the mesh was refined about 30% in every run for ten iteration. The mesh density is set to be "extremely fine"; and the mesh number ends up in 302,982.

Results and Discussion

Figure 3:
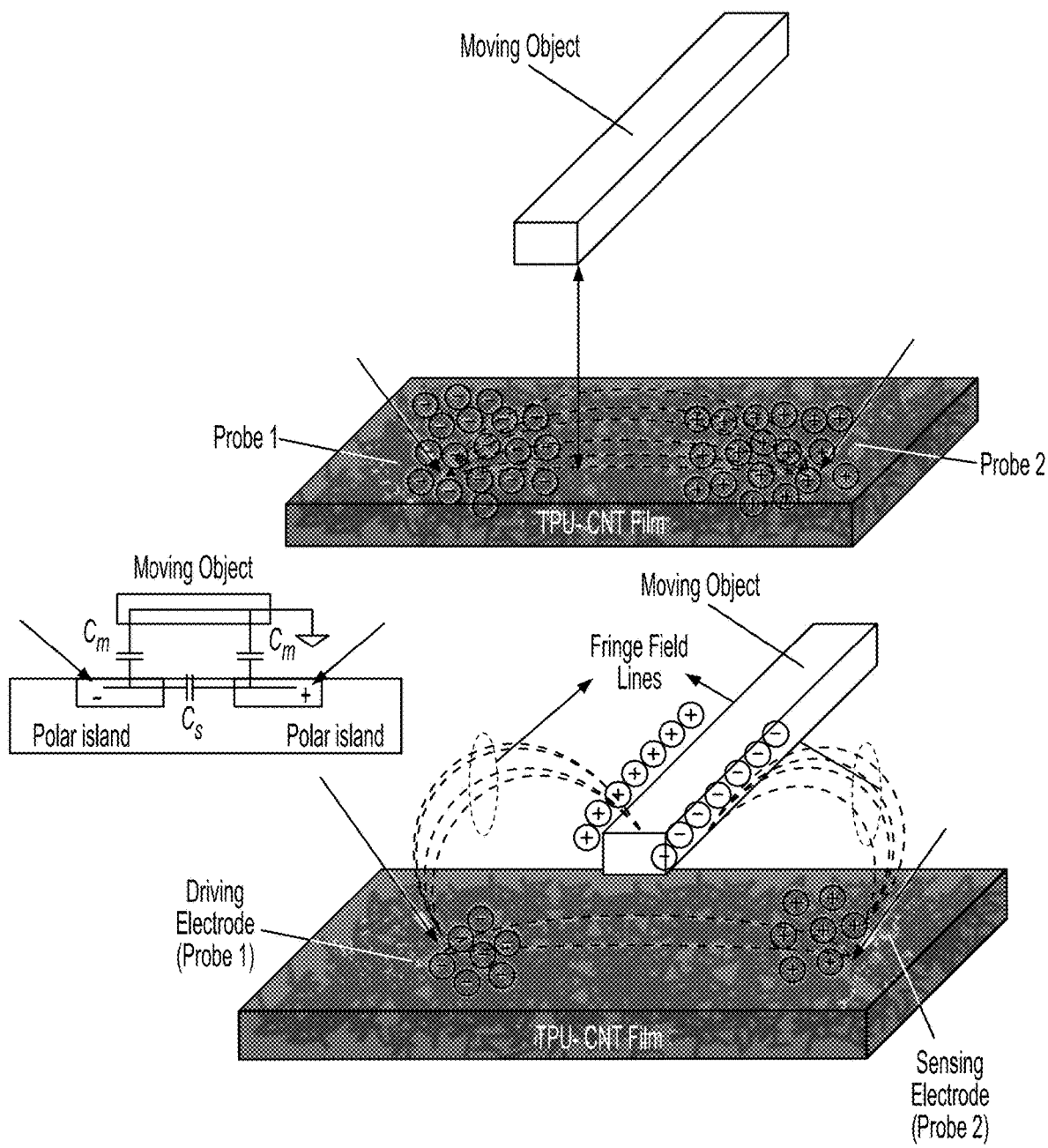
FIG. 3 illustrates a schematic of a circuit equivalent to a sensor incorporating at least one TPU-CNT composite of the present disclosure.

TPU-CNT films can be a replacement for conventional proximity sensors, due to its simpler fabrication process, flexibility, and durability. Proximity detection is defined by the change in the amount of measured capacitance of the TPU-CNT film due to the presence of an object in the electric field around it. FIG. 2 illustrates the measurement setup and how data was analyzed. The sensor probes are mechanically semi-planar with an angle of 45 degree to eliminate the noise and reduce the penetration depth inside the film. To identify physics of the sensation, this sensing film constitutes two types of capacitors including a capacitor between nearby probes (self-capacitance—$C_s$) and fringe capacitance (mutual capacitance—$C_m$), caused by the overlapping fringing field between the surface of the object, film and probes. As shown in FIG. 3, the electric field line does not fully horizontally match with the linear distance between the probes. When an object is not close to the film, the fringe capacitance between each probe with object is negligible. At closer distances to the probes, the fringe field between film and the sensing object becomes significant, as seen in FIG. 3. Theoretically, shunting of the electric field changes the overall capacitance of the film. Gauss' law for electricity states that the electric flux through any closed surface is proportional to the total charge enclosed by the surface, $$\int \vec{E} \cdot d\vec{A} = \frac{Q}{\varepsilon_0}.$$

Hence, electric field strength emanating from film capacitor is shunted and weakened by the object, thereby lowering the charges stored in the film capacitor. Furthermore, the mutual capacitance of sensor increases due to the reduced distance between probes and object while the capacitance of the actual film (self-capacitance) drops due to the change in the charge balance (C=Q/V). Thus, while right probe (sensing electrode) and the moving object are DC grounded, certain amount of charges migrates from the grounded probe to the moving object, resulting in the reduction of stored surface charges on the film and subsequently overall capacitance reduction (FIG. 3).

Having an optimal nanocomposite sensor, five different CNT contents are studied. FIG. 5a shows sensitivity (ΔC/C %) of proximity sensor with respect to the weight percent of CNT. However, Pure TPU does not show any noticeable capacitance change under the test. Absolute percentage change of capacitance to the initial capacitance was plotted against distance. Measurement is aimed to be performed within a range of 20 cm. The object starts moving closer to the sensor from a distance of 22 cm and eventually stops off at 2 cm. Due to the surface charge migration (fringe effect), the capacitance radically drops for the distances lower than 2 cm. Below 2 cm, sensor acts more like a tactile capacitive sensor which is not the purpose of this study. Although changes in the capacitance occur relatively from 22 cm for CNTs 1 wt %., the limit for visible proximity sensing is about 12 cm, which becomes prominent at 2 cm. We also directly calculated the sensor's sensitivity to the detection distance. Our calculations suggest that the sensor's capacitance output will vary on the order of 10 fF per centimeter. Given that the sensor operates on the sensitivity order of 100 fF, this represents a sensitivity of 0.3%/mm, meaning that it should be fairly sensitive to distance variation in a long detection range. The response time of this sensor is about 30 ms, which is comparable with reported values in Table 1.

The improved sensitivity of the very sensor possibly arises from the nanostructured architecture, which have a higher density of the electric field originating from larger polarization of the polymer by the presence of highly conductive nanotubes. Thus, the field can be enhanced while the nano particles are acting as an embedded conducting network within the polymer structure and it leads to improvement of polarization inside the nonconductive polymer. As seen from FIG. 5a, the sensitivity graph shows 2 wt % with quite high sensitivity but less noticeable noise among other CNT contents. The physics behind the observed noise data (FIG. 5a) is that this number of nanoparticles provides a certain number of conductive pathways due to the percolation of CNTs inside the TPU structure. In percolation threshold, not only the electrical conductivity of the composite enhances remarkably but it also rises the chance of trapping charges by applying a presoak voltage. Hence, the conductivity of the film can be generally described in terms of modified classical percolation behavior using eq (1):

$$\sigma = \sigma_0 (p - p_c)^t \quad (1)$$

where $p_c$ is the percolation threshold, t reflects the dimensionality of the conductive networks in the composite, and p is the volume fraction of the fillers which depends on the electrical conductivity of the composite film at a given filler loading (σ) and the proportionality constant ($\sigma_0$) that is related to the intrinsic conductivity of the filler. The values of $p_c$ and t of composite films were determined by fitting of the experimental data. The conductivities of the TPU film containing CNT as a function of filler content is plotted in FIG. 5(b). A fairly high percolation threshold of 1.3 wt % and a scaling exponent t is 4.5 was estimated in the TPU-CNT nanocomposites. In addition, the films containing CNT alone are observed to show a rapid increase in electrical conductivity by about 7 orders of magnitude (from 5.06× 10-14 to 1.2×10-7 Scm−1) when the CNT content was increased from neat to 1 wt %. This sharp change in conductivity indicates the formation of percolating network in the polymer matrix. Although the inherently high conductivity and high aspect ratios of CNTs allow them to form electrical pathways more easily in the polymer matrix, the morphology of the conductive filler also plays an important role in the geometry of the conductive network in the matrix[68].

Here, Scanning Electron Microscope (SEM) analysis is utilized to investigate the morphology of CNTs conductive networks in the TPU matrix. FIG. 1a-d illustrates cross-section microstructure of TPU-CNTs by SEM for neat TPU, 1, 2 and 5 wt % CNTs contents. White dots and lines represent CNTs within the polymer matrix. It can be seen that CNTs exhibit relatively homogeneous dispersion in the TPU matrix, and there is no serious aggregation phenomenon. Furthermore, after percolation process conductive pathways becomes more solid and apparent, and not only lower standard deviations (i.e., noise) but a good sensitivity also is expected. At CNT content of 5 wt %, the dispersion of CNTs becomes denser and most of CNT contact each other, forming a denser CNT network structure in the whole TPU matrix.

Additionally, another remarkable trend is that proximity sensitivity of the TPU-CNT sensors lowers by increasing the CNT content (from 1 wt % toward 5 wt % CNTs). TPU has been known as a high polar polymer which can be used as a perfect dielectric. TPU in the form of multi-block copolymers also contains of more high polarity segments (called hard-short segments), which leads to formation of surface charge and consequently higher polarization in the presence of an electric field. Addition of CNTs inside the TPU structure, makes the film semi-conductive and increases the polarity. As consequently observed, the initial capacitance of the TPU/CNT film has been increased by adding CNTs content. However, the maximum sensitivity ($\Delta C/C$ %) has been observed at the lower content of CNTs (1 wt %). This phenomenon allows us to conclude that the maximum sensitivity would be possibly achieved around the percolation threshold (1.3% wt CNT) and afterward, the sensitivity drastically drops. This decreasing trend can be interpreted by the performance of both matrix and nanoparticles. By addition of CNT, clusters of non-conductive TPU and highly conductive CNT form higher capability of polarization. Consequently, adding higher percentage of CNT[69-72] increases the conductivity and initial capacitance, but lowers slope of polarity growth. Within higher CNT concentrations, larger polar islands are being formed on the TPU film in presence of an electric field (FIG. 3). Thus, by approaching the object with limited charges to the TPU-CNT samples with higher polarity, less percentage change of capacitance has been measured due to less difference in the transferred charges. This supports the observation of less sensitivity in samples with higher CNT concentration.

Figure 6A:
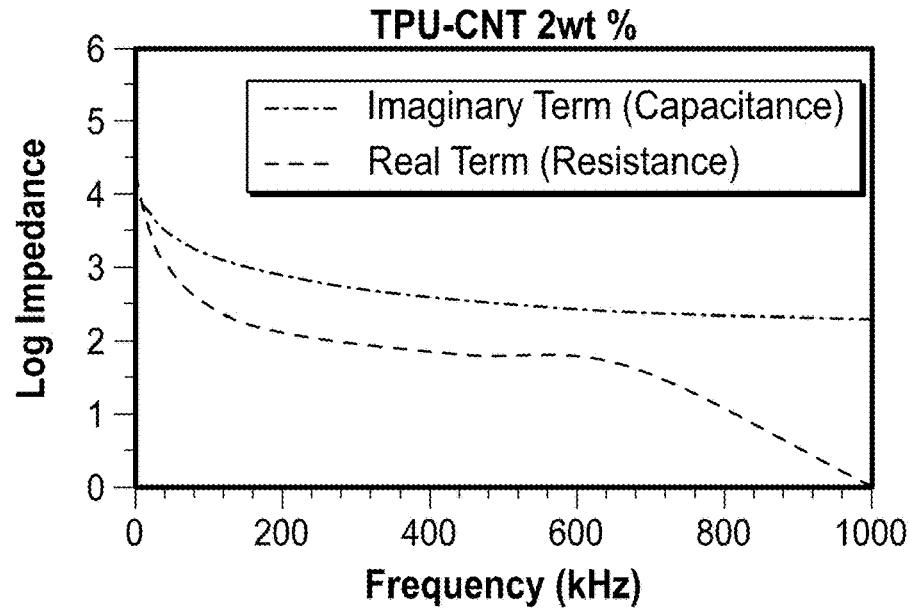
FIG. 6A illustrates a graphical representation of sensor characterization of a sensor having a 2% TPU-CNT concentration with a Nyquist stability plot of the impedance sensing to the magnetic field at different exciting frequencies.
Figure 6B:
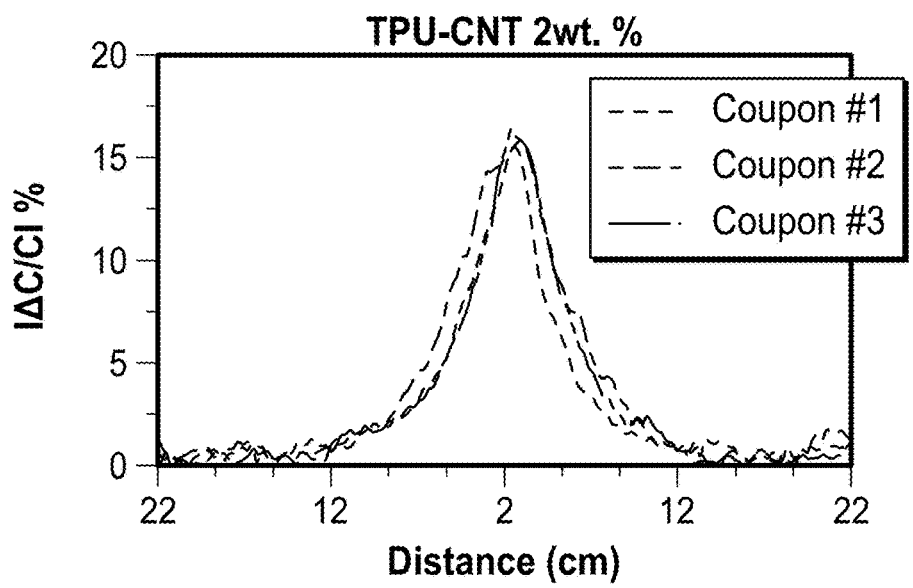
FIG. 6B illustrates a graphical representation of reproducibility response plots of sensors for three different coupons of a similar manufacturing process.
Figure 6C:
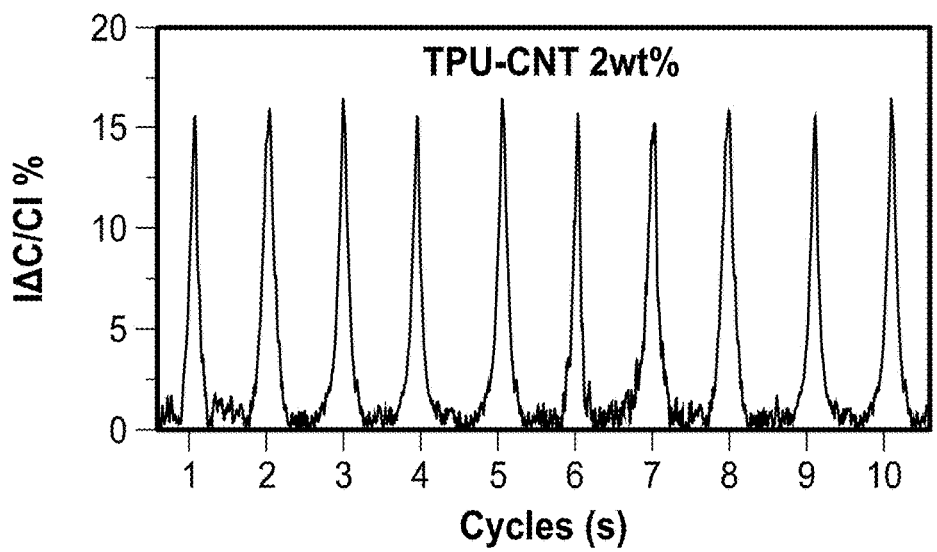
FIG. 6C illustrates a graphical representation of repeatability response plots with several identical approaching cycles with repeatable peaks.

To achieve the maximum stability for the capacitance measurements, in FIG. 6A, Nyquist plots were utilized to demonstrate the impedance sensitivity with respect to the frequency for TPU-CNT 2 wt %. sample as to determine the stable region of frequency. As it can be observed from Electrochemical Impedance Spectroscopy (EIS), the stable region of frequency response for imaginary impedance (capacitance) is initiated at around 500 kHz. On the other hand, that of the real impedance (resistance) is detected between 400 to 600 kHz. Therefore, to achieve the maximum stability and efficiency, 500 kHz was chosen the sensor operating frequency. This frequency provides maximum stability for the impedance while the frequency response does not alter the resistance of the film or change the capacitance of the sensors. This would improve in minimization of measurement errors (i.e., noise) and provide maximum sensitivity for the film sensor. Despite higher frequencies may render more sensitivity and relatively lower noise, energy consumption drastically increases. Reproducibility and repeatability sensing responses of 2 wt %. CNTs are shown in FIG. 6b, c. Reproducibility response of the sensor is assessed for three different coupons of similar manufacturing process. Subsequently, cycling response has been analyzed and its peaks are apparently very self-repeating (FIG. 6c).

Figure 6D:
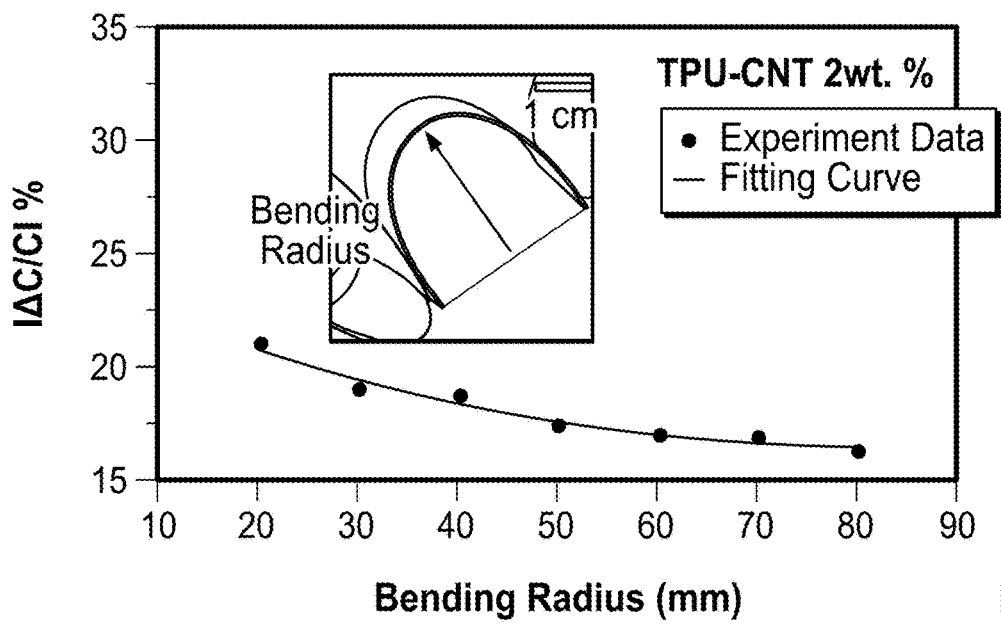
FIG. 6D illustrates a graphical representation of relative change in capacitance of sensor film under various bending radii of 20-80 mm.
Figure 6E:
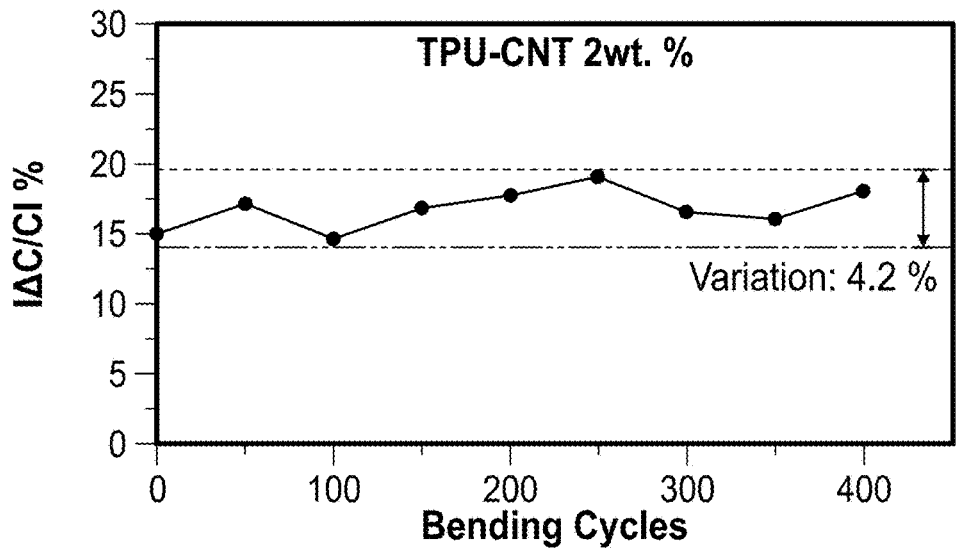
FIG. 6E illustrates a graphical representation of mechanical flexibility of the tactile sensor relative to change in capacitance measured for 400 bending/relaxing cycles at a bending radius of 20 mm.

An important improvement of polymeric proximity sensors, in order to widen their applicability, is sufficient mechanical flexibility to allow for stable operation under bending conditions. FIG. 6d shows a photograph of the flexible proximity sensor subjected to bending. The flexibility of the sensor was examined by measuring capacitance changes with respect to its before-bent sample under applying various bending radii. The capacitance increases as the bending radius decreases and reaches $\approx 21\%$ at a maximum bending (radius of 20 mm). At the lower bending curvature (higher radii) of 2 wt. % TPU-CNT sensor, the percentage magnitude of capacitance change becomes closer to the before-bent one ($\approx 15\%$)—shown earlier in FIG. 5a. So, the capacitive response of highest radius (lowest external bending) is insignificant (4.7%) respect to that of lowest radius (highest bending). In another word, the capacitance recovered to its initial value with no permanent changes, demonstrating robust mechanical flexibility of the TPU-CNT sensor. To evaluate the durability of the sensor against bending, we conducted cyclic tests with repeated bending and relaxing (see FIG. 6e). The variation of the capacitance change is lower than 4.2% over 400 cycles of bending at a radius of 20 mm, and thus the capacitive output of the sensor remained stable to the repeated bending.

Figure 7A:
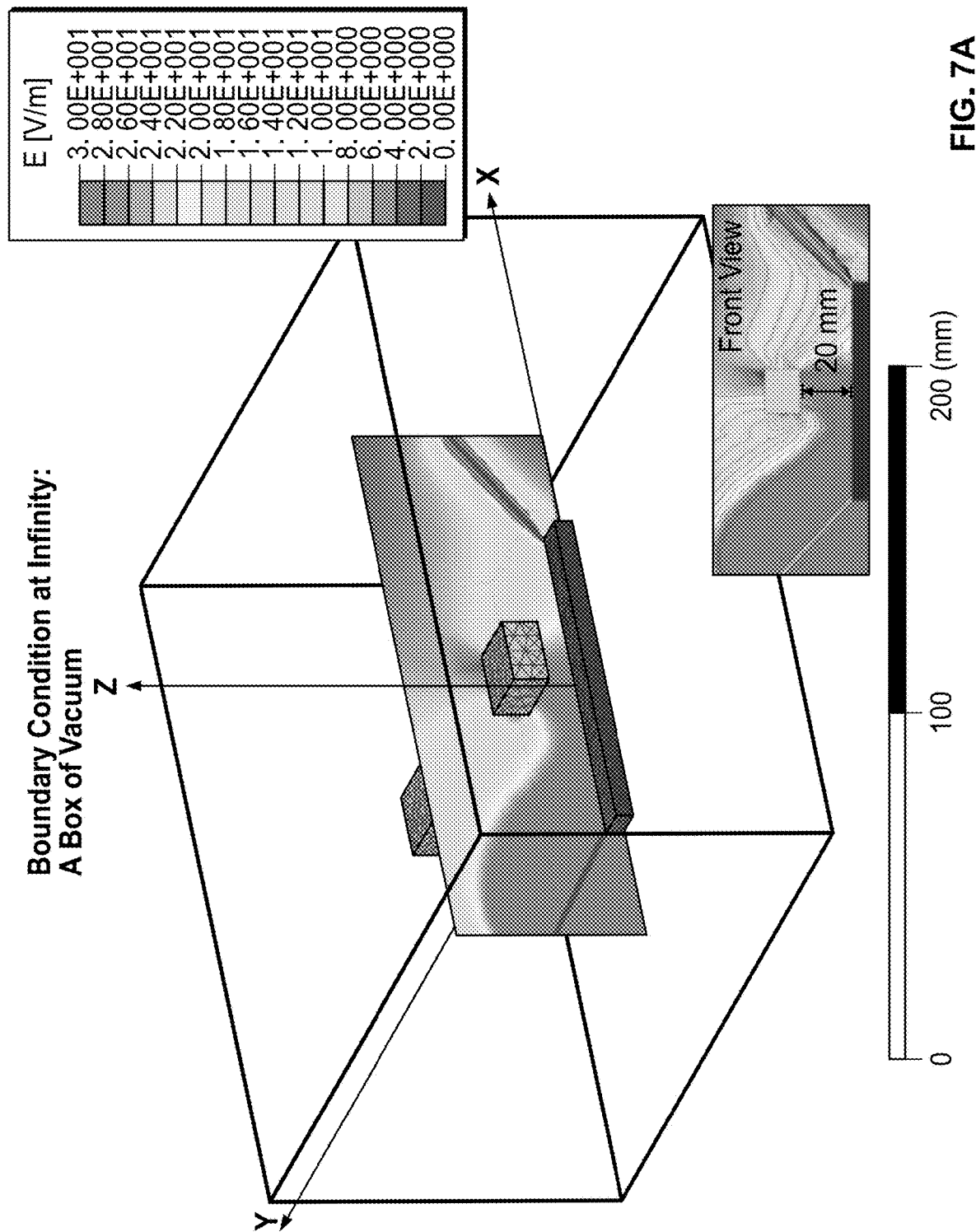
FIG. 7A illustrates simulation results of a basic fringe field cell with a simple 3D Ansoft Maxell model having implemented material properties, boundary conditions, vacuum domain, and mesh and voltage distribution of a sensor at closest proximity (20 mm) inside a vacuum box.
Figure 7B:
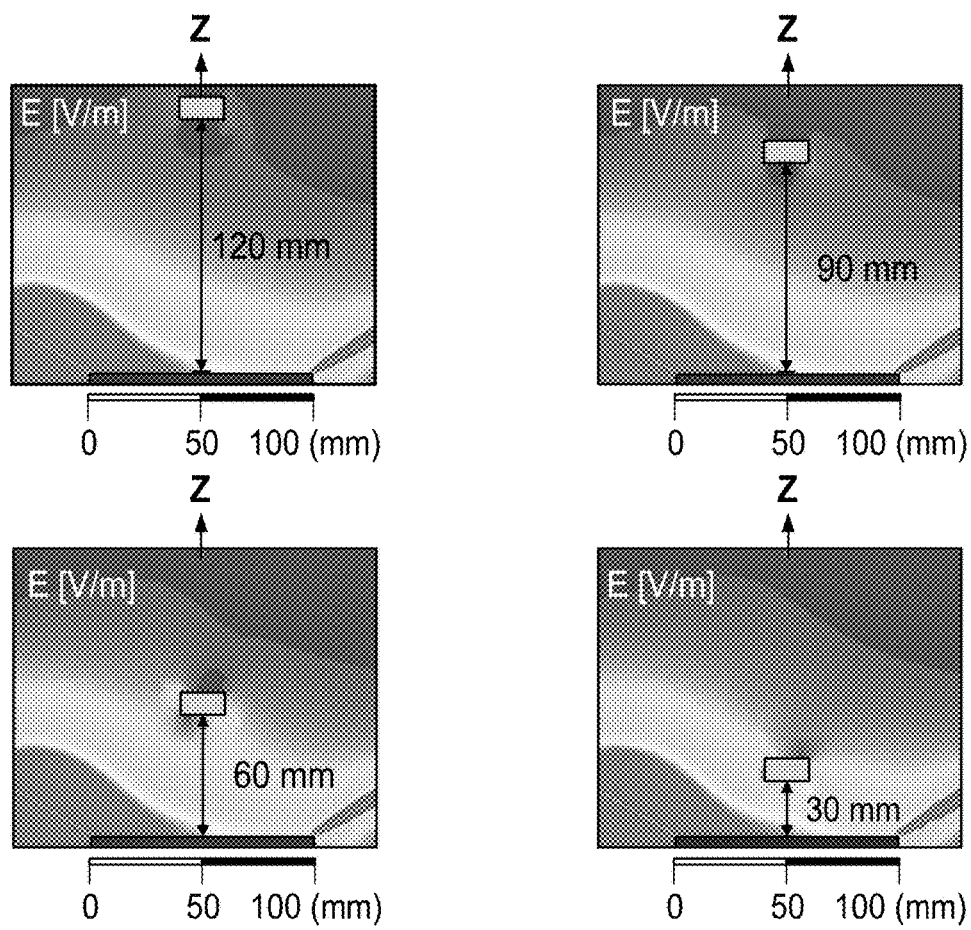
FIG. 7B illustrates simulation results of a basic fringe field cell with a simple 3D Ansoft Maxell model having voltage distribution between two probes in the range of 120 mm to 30 mm.
Figure 7C:
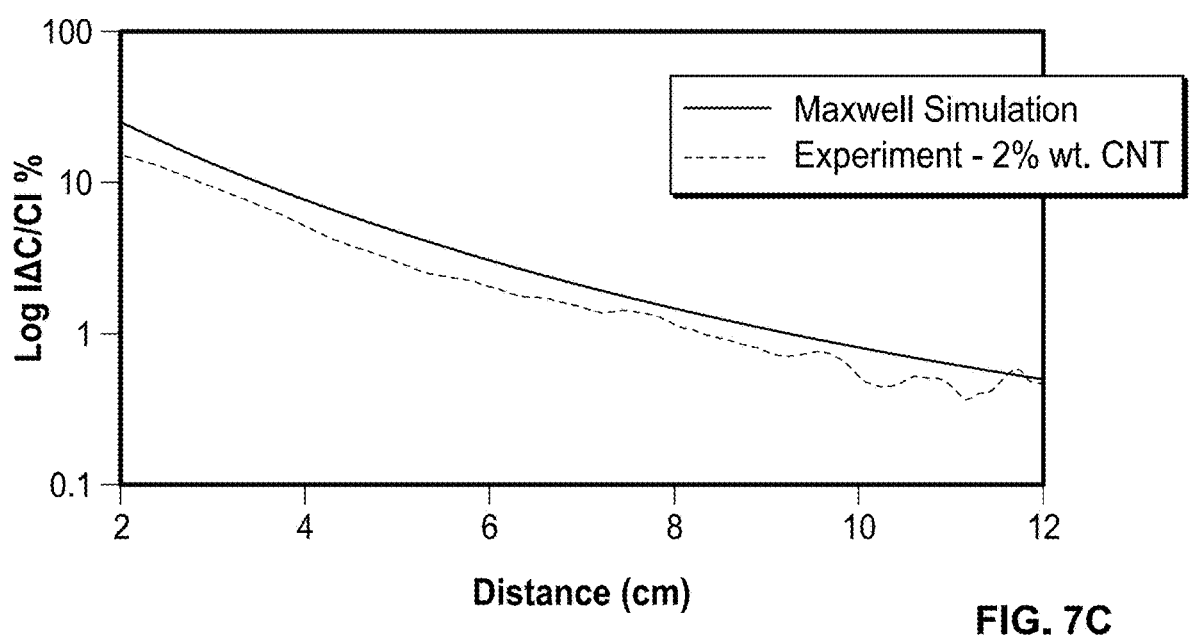
FIG. 7C illustrates simulation results of a basic fringe field cell with a simple 3D Ansoft Maxell model having experimental and Maxwell simulation comparison of capacitance change as a function of distance.

As earlier mentioned, the sensing mechanism is based on the object interference with the electrical field between two probes. The interference disturbed and reduced the number of electric field lines (i.e., self-capacitance) and consequently, stored charged decreased radically on the polymer. To assure that the capacitance change comes from the fringe phenomenon, a simple 3D model is simulated in Ansoft Maxwell. FIG. 7a demonstrates the measurement setup in which object, material properties, boundary conditions, vacuum domain and excitation (i.e. applied voltages) are implemented (further details are available in FEM section2.). This figure shows the electric field streamlines in the vacuum domain on the symmetric plane passed through, where a voltage difference of 5V is applied between the two probes of tungsten. Primitivity and bulk conductivity of 2 wt %. CNT sample are approximately employed as the material input property of TPU-CNT. Capacitance measurements have been illustrated in FIG. 7b, for different distances between the grounded object and the substrate (i.e. electrostatic simulation). Applying the voltage to the TPU-CNT film sensor, the formation of potential gradients around the substrates is observed. By introducing the object inside the formed electric field, the disturbance of the field has been detected and used as the sensing mechanism. As observed in FIG. 7b, while the object is at very far distance (>80 mm), there is minimal change in the potential surfaces (stored charges) and the field is uniform. By lowering the distance, the field shape changes and high potential surface forms between the object and the surface of the film in z direction and thus leads to the migration of surface charges and formation of fringe fields around the object. Although the object is smaller than the TPU-CNT sensing film, the fringe fields have been created on both extremities of the object. The fields change the polarization (the charge balance) of the TPU-CNT film and outcome in formation of unexpected store charged between the object and the film. By reduction of the distance (<30 mm), the field creates a new capacitor between the film and the object and the stored charge on the film are being interrupted, and this eventually leads to more reduction in the capacitance of the film sensor. While the electric field between the probes and the object (mutual capacitance-Cm) are responsible for the reduction of electrodes capacitance (self-capacitance), their change is not being measured neither in the simulation model nor in the experiments. In a short, the overall capacitance changes of the sensor (self-capacitance) is majorly under the influence of object movement and the resistivity of film sensor. As displayed in FIG. 7c, capacitance decreases when the object-sensor distance goes from 120 mm to 20 mm. Furthermore, the experimental result closely follows the Maxwell simulation trend in logarithmic scale and simulation is capable of identifying the fringing effect. Need to say, running a very accurate simulation in which, we can observe the exact values of the experiment needs a strong computational multiscale-model which is under study of future of this work.

CONCLUSION

A flexible ultrasensitive polymer-based proximity sensor was presented. The TPU was reinforced by adding CNTs and delivered the potential to adjust the sensitivity based on electrical behavior of CNTs. The developed sensor was sensing based on the change of the capacitance that was mainly quantified by fringe effects. Although 1 wt %. CNTs showed highest sensitivity, 2 wt % CNTs exhibited lowest noise along with the significant sensitivity. Fringing field and tunneling effects (polarity) were addressed as two main explanations of observing the changes trend of the capacitance(sensitivity). As the object approached the sensor, electric field partially started to be distracted and accumulated over the object. Local surface charges migrated from the film sensor and consequently the self-capacitance declined. Additionally, tunneling network pathways resulted in higher amount of polarization (less transferred charge) justified higher sensitivity in the samples with lower wt %. of CNTs. Frequency of 500 kHz was selected as the optimum to minimize noise as well as power consumption. We further discussed extraordinary flexibility under the bending loading and durability during loading/unloading process with the variation of below 5%. The sensor can sense the object movement with a fast response time/range, high repeatability and cycling feasibility.

Lastly, the numerical simulation results were capable of accurately following the fringe effect and showed decreasing trend of capacitance as previously shown in the experiments. Overall, the detection performance of our described proximity sensor implies potential applications in the field of smart flexible devices which is the best platform to realize and monitor the movement of objects. The flexibility, high sensitivity, and notable stability of the proposed sensor, along with extremely simple fabrication process, offer an alternative to the current controlled electrical proximity sensors for incorporation into wearable gadgets and future smart electronic devices.

REFERENCES

[1] Katragadda R B and Xu Y 2008 A novel intelligent textile technology based on silicon flexible skins *Sens. Actuators, A* 143 169-74

[2] Shin J, Liu Z, Bai W, Liu Y, Yan Y, Xue Y, Kandela I, Pezhouh M, MacEwan M R and Huang Y 2019 Bioresorbable optical sensor systems for monitoring of intracranial pressure and temperature *Sci. Adv.* 5 eaaw1899

[3] Gao W, Emaminejad S, Nyein H Y Y, Challa S, Chen K, Peck A, Fahad H M, Ota H, Shiraki H and Kiriya D 2016 Fully integrated wearable sensor arrays for multiplexed in situ perspiration analysis *Nature* 529 509

[4] Sarwar M S, Dobashi Y, Preston C, Wyss J K M, Mirabbasi S and Madden J D W 2017 Bend, stretch, and touch: Locating a finger on an actively deformed transparent sensor array *Sci. Adv.* 3 e1602200

[5] He W, Wang C, Wang H, Jian M, Lu W, Liang X, Zhang X, Yang F and Zhang Y 2019 Integrated textile sensor patch for real-time and multiplex sweat analysis *Sci. Adv.* 5 eaax0649

[6] Gong S, Schwalb W, Wang Y, Chen Y, Tang Y, Si J, Shirinzadeh B and Cheng W 2014 A wearable and highly sensitive pressure sensor with ultrathin gold nanowires *Nat. Commun.* 5 3132

[7] Guo H, Pu X, Chen J, Meng Y, Yeh M-H, Liu G, Tang Q, Chen B, Liu D, Qi S, Wu C, Hu C, Wang J and Wang Z L 2018 A highly sensitive, self-powered triboelectric auditory sensor for social robotics and hearing aids *Sci. Rob.* 3 eaat2516

[8] Shepherd R F, Ilievski F, Choi W, Morin S A, Stokes A A, Mazzeo A D, Chen X, Wang M and Whitesides G M 2011 Multigait soft robot *Proc. Natl. Acad. Sci. U.S.A.* 108 20400-3

[9] Schmidt P A, Maël E and Würtz R P 2006 A sensor for dynamic tactile information with applications in human—robot interaction and object exploration *Rob. Auton. Syst.* 54 1005-14

[10] Park J, Lee Y, Hong J, Lee Y, Ha M, Jung Y, Lim H, Kim S Y and Ko H 2014 Tactile-direction-sensitive and stretchable electronic skins based on human-skin-inspired interlocked microstructures *ACS nano* 8 12020-9

[11] Kim J, Lee M, Shim H J, Ghaffari R, Cho H R, Son D, Jung Y H, Soh M, Choi C and Jung S 2014 Stretchable silicon nanoribbon electronics for skin prosthesis *Nat. Commun.* 5 5747

[12] Hammock M L, Chortos A, Tee B C K, Tok J B H and Bao Z 2013 25th anniversary article: the evolution of electronic skin (e-skin): a brief history, design considerations, and recent progress *Adv. Mater.* 25 5997-6038

[13] Zhang B-C, Wang H, Zhao Y, Li F, Ou X-M, Sun B-Q and Zhang X-H 2016 Large-scale assembly of highly sensitive Si-based flexible strain sensors for human motion monitoring *Nanoscale* 8 2123-8

[14] Atalay A, Sanchez V, Atalay O, Vogt D M, Haufe F, Wood R J and Walsh C J 2017 Batch fabrication of customizable silicone-textile composite capacitive strain sensors for human motion tracking *Adv. Mater. Technol.* 2 1700136

[15] Choi D Y, Kim M H, Oh Y S, Jung S-H, Jung J H, Sung H J, Lee H W and Lee H M 2017 Highly stretchable, hysteresis-free ionic liquid-based strain sensor for precise human motion monitoring *ACS Appl. Mater. Interfaces* 9 1770-80

[16] Wu Y, Liu Y, Zhou Y, Man Q, Hu C, Asghar W, Li F, Yu Z, Shang J, Liu G, Liao M and Li R-W 2018 A skin-inspired tactile sensor for smart prosthetics *Sci. Rob.* 3 eaat0429

[17] Kim S Y, Park S, Park H W, Park D H, Jeong Y and Kim D H 2015 Highly Sensitive and Multimodal All-Carbon Skin Sensors Capable of Simultaneously Detecting Tactile and Biological Stimuli *Adv. Mater.* 27 4178-85

[18] Yeom C, Chen K, Kiriya D, Yu Z, Cho G and Javey A 2015 Large-area compliant tactile sensors using printed carbon nanotube active-matrix backplanes *Adv. Mater.* 27 1561-6

[19] Harada S, Kanao K, Yamamoto Y, Arie T, Akita S and Takei K 2014 Fully printed flexible fingerprint-like three-axis tactile and slip force and temperature sensors for artificial skin *ACS nano* 8 12851-7

[20] Cho I-J, Lee H-K, Chang S-I and Yoon E 2017 Compliant ultrasound proximity sensor for the safe operation of human friendly robots integrated with tactile sensing capability *J. Electr. Eng. Technol.* 12 310-6

[21] Lee H-K, Chang S-I and Yoon E 2009 Dual-mode capacitive proximity sensor for robot application: Implementation of tactile and proximity sensing capability on a single polymer platform using shared electrodes *IEEE Sens. J.* 9 1748-55

[22] Sun X, Sun J, Li T, Zheng S, Wang C, Tan W, Zhang J, Liu C, Ma T, Qi Z, Liu C and Xue N 2019 Flexible Tactile Electronic Skin Sensor with 3D Force Detection Based on Porous CNTs/PDMS Nanocomposites *Nano-Micro Letters* 11 57

[23] Kulkarni M R, John R A, Rajput M, Tiwari N, Yantara N, Nguyen A C and Mathews N 2017 Transparent flexible multifunctional nanostructured architectures for non-optical readout, proximity, and pressure sensing *ACS Appl. Mater. Interfaces* 9 15015-21

[24] Tsuji S and Kohama T 2019 Proximity Skin Sensor using Time-of-flight Sensor for Human Collaborative Robot *IEEE Sens. J.*

[25] Koibuchi K, Sawa K, Honma T, Hayashi T, Ueda K and Sasaki H 2006 Loss estimation and sensing property enhancement for eddy-current-type proximity sensor *IEEE Sens. J.* 42 1447-50

[26] Zhang H and Rogers J A 2019 Recent advances in flexible inorganic light emitting diodes: From materials design to integrated optoelectronic platforms *Adv. Opt. Mater.* 7 1800936

[27] Zhou L-Y, Gao Q, Zhan J-F, Xie C-Q, Fu J-Z and He Y 2018 Three-dimensional printed wearable sensors with liquid metals for detecting the pose of snakelike soft robots *ACS Appl. Mater. Interfaces* 10 23208-17

[28] Ojuroye O O, Torah R N, Komolafe A O and Beeby S P 2019 Embedded capacitive proximity and touch sensing flexible circuit system for electronic textile and wearable systems *IEEE Sens. J.* 19 6975-85

[29] Aliheidari N, Aliahmad N, Agarwal M and Dalir H 2019 Electrospun Nanofibers for Label-Free Sensor Applications *Sensors* 19 3587

[30] Kang M, Kim J, Jang B, Chae Y, Kim J-H and Ahn J-H 2017 Graphene-based three-dimensional capacitive touch sensor for wearable electronics *ACS nano* 11 7950-7

[31] Langfelder G, Longoni A F, Tocchio A and Lasalandra E 2010 MEMS motion sensors based on the variations of the fringe capacitances *IEEE Sens. J.* 11 1069-77

[32] Lee C-Y, Wu G-W and Hsieh W-j 2008 Fabrication of micro sensors on a flexible substrate *Sens. Actuators, A* 147 173-6

[33] Liu C-X and Choi J-W 2009 Patterning conductive PDMS nanocomposite in an elastomer using microcontact printing *J. Micromech. Microeng.* 19 085019

[34] Khan S, Tinku S, Lorenzelli L and Dahiya R S 2014 Flexible tactile sensors using screen-printed P (VDF-TrFE) and MWCNT/PDMS composites *IEEE Sens. J.* 15 3146-55

[35] Choong C L, Shim M B, Lee B S, Jeon S, Ko D S, Kang T H, Bae J, Lee S H, Byun K E and Im J 2014 Highly stretchable resistive pressure sensors using a conductive elastomeric composite on a micropyramid array *Adv. Mater.* 26 3451-8

[36] Pan L, Chortos A, Yu G, Wang Y, Isaacson S, Allen R, Shi Y, Dauskardt R and Bao Z 2014 An ultra-sensitive resistive pressure sensor based on hollow-sphere microstructure induced elasticity in conducting polymer film *Nat. Commun.* 5 3002

[37] Vandeparre H, Watson D and Lacour S 2013 Extremely robust and conformable capacitive pressure sensors based on flexible polyurethane foams and stretchable metallization *Appl. Phys. Lett.* 103 204103

[38] Zhang B, Xiang Z, Zhu S, Hu Q, Cao Y, Zhong J, Zhong Q, Wang B, Fang Y and Hu B 2014 Dual functional transparent film for proximity and pressure sensing *Nano Res.* 7 1488-96

[39] Daneshkhah A, Vij S, Siegel A P and Agarwal M 2019 Polyetherimide/carbon black composite sensors demonstrate selective detection of medium-chain aldehydes including nonanal *Chem. Eng.* 1 123104

[40] Yao S and Zhu Y 2014 Wearable multifunctional sensors using printed stretchable conductors made of silver nanowires *Nanoscale* 6 2345-52

[41] Kim S-R, Kim J-H and Park J-W 2017 Wearable and transparent capacitive strain sensor with high sensitivity based on patterned Ag nanowire networks *ACS applied materials & interfaces* 9 26407-16

[42] Lipomi D J, Vosgueritchian M, Tee B C, Hellstrom S L, Lee J A, Fox C H and Bao Z 2011 Skin-like pressure and strain sensors based on transparent elastic films of carbon nanotubes *Nature nanotechnology* 6 788

[43] Cai L, Song L, Luan P, Zhang Q, Zhang N, Gao Q, Zhao D, Zhang X, Tu M and Yang F 2013 Super-stretchable, transparent carbon nanotube-based capacitive strain sensors for human motion detection *Scientific reports* 3 1-9

[44] Wang X, Li T, Adams J and Yang J 2013 Transparent, stretchable, carbon-nanotube-inlaid conductors enabled by standard replication technology for capacitive pressure, strain and touch sensors *Journal of Materials Chemistry A* 1 3580-6

[45] Kwon D, Lee T-I, Shim J, Ryu S, Kim M S, Kim S, Kim T-S and Park I 2016 Highly sensitive, flexible, and wearable pressure sensor based on a giant piezocapacitive effect of three-dimensional microporous elastomeric dielectric layer *ACS applied materials & interfaces* 8 16922-31

[46] Cohen D J, Mitra D, Peterson K and Maharbiz M M 2012 A highly elastic, capacitive strain gauge based on percolating nanotube networks *Nano letters* 12 1821-5

[47] Lee S M, Byeon H J, Lee J H, Baek D H, Lee K H, Hong J S and Lee S-H 2014 Self-adhesive epidermal carbon nanotube electronics for tether-free long-term continuous recording of biosignals *Scientific reports* 4 6074

[48] Filippidou M, Tegou E, Tsouti V and Chatzandroulis S 2015 A flexible strain sensor made of graphene nanoplatelets/polydimethylsiloxane nanocomposite *Microelectronic Engineering* 142 7-11

[49] Nguyen T D, Kim T, Han H, Shin H Y, Nguyen C T, Phung H and Choi H R 2018 Characterization and optimization of flexible dual mode sensor based on Carbon Micro Coils *Materials Research Express* 5 015604

[50] Nguyen T D, Han H S, Shin H-Y, Nguyen C T, Phung H, Van Hoang H and Choi H R 2017 Highly sensitive flexible proximity tactile array sensor by using carbon micro coils *Sensors and Actuators A: Physical* 266 166-77

[51] Sadasivuni K K, Kafy A, Zhai L, Ko H U, Mun S and Kim J 2015 Transparent and flexible cellulose nanocrystal/reduced graphene oxide film for proximity sensing *Small* 11 994-1002

[52] Secor E B and Hersam M C 2015 Emerging carbon and post-carbon nanomaterial inks for printed electronics *J. Phys. Chem. Lett.* 6 620-6

[53] Arapov K, Rubingh E, Abbel R, Laven J, de With G and Friedrich H 2016 Conductive Screen Printing Inks by Gelation of Graphene Dispersions *Adv. Funct. Mater.* 26 586-93

[54] Kinloch I A, Suhr J, Lou J, Young R J and Ajayan P M 2018 Composites with carbon nanotubes and graphene: An outlook *Science* 362 547-53

[55] Khan S, Lorenzelli L and Dahiya R S 2014 Technologies for printing sensors and electronics over large flexible substrates: a review *IEEE Sens. J.* 15 3164-85

[56] Park J, Lee Y, Hong J, Ha M, Jung Y-D, Lim H, Kim S Y and Ko H 2014 Giant tunneling piezoresistance of composite elastomers with interlocked microdome arrays for ultrasensitive and multimodal electronic skins *ACS nano* 8 4689-97

[57] Abdi Y, Ebrahimi A, Mohajerzadeh S and Fathipour M 2009 High sensitivity interdigited capacitive sensors using branched treelike carbon nanotubes on silicon membranes *Appl. Phys. Lett.* 94 173507

[58] Hu N, Karube Y, Arai M, Watanabe T, Yan C, Li Y, Liu Y and Fukunaga H 2010 Investigation on sensitivity of a polymer/carbon nanotube composite strain sensor *Carbon* 48 680-7 0008-6223

[59] Song A M, Wedge D C, Madec M B, Yeates S G and Turner M L 2010 Fabrication of planar organic nanotransistors using low temperature thermal nanoimprint lithography for chemical sensor applications *Nanotechnology* 21 1361-6528

[60] Song X, Liu S, Gan Z, Lv Q, Cao H and Yan H 2009 Controllable fabrication of carbon nanotube-polymer hybrid thin film for strain sensing *Microelectron. Eng.* 86 2330-3 0167-9317

[61] Su W-S, Lin C-M, Chen T-H and Fang W 2009 Patterning and growth of carbon nanotubes on a highly structured 3D substrate surface *Journal of Micromechanics and Microengineering* 19 105009%@ 0960-1317

[62] Hu C-F, Su W-S and Fang W 2011 Development of patterned carbon nanotubes on a 3D polymer substrate for the flexible tactile sensor application *J. Micromech. Microeng.* 21 115012 0960-1317

[63] Tang W, Santare M H and Advani S G 2003 Melt processing and mechanical property characterization of multi-walled carbon nanotube/high density polyethylene (MWNT/HDPE) composite films *Carbon* 41 2779-85 0008-6223

[64] Spitalsky Z, Tasis D, Papagelis K and Galiotis C 2010 Carbon nanotube-polymer composites: chemistry, processing, mechanical and electrical properties *Prog. Polym. Sci.* 35 357-401 0079-6700

[65] Cho I-J, Lee H-K, Chang S-I and Yoon E 2017 Compliant ultrasound proximity sensor for the safe operation of human friendly robots integrated with tactile sensing capability *Journal of Electrical Engineering and Technology* 12 310-6

[66] Kohama T and Tsuji S 2015 Tactile and proximity measurement by 3D tactile sensor using self-capacitance measurement. In: 2015 *IEEE SENSORS*: IEEE) pp 1-4

[67] Ojuroye O O, Torah R N, Komolafe A O and Beeby S P 2019 Embedded capacitive proximity and touch sensing flexible circuit system for electronic textile and wearable systems *IEEE Sensors Journal* 19 6975-85

[68] Yoo T W, Lee Y K, Lim S J, Yoon H G and Kim W N 2014 Effects of hybrid fillers on the electromagnetic interference shielding effectiveness of polyamide 6/conductive filler composites *Journal of Materials Science* 49 1701-8

[69] Hu N, Fukunaga H, Atobe S, Liu Y and Li J 2011 Piezoresistive strain sensors made from carbon nanotubes based polymer nanocomposites *Sensors* 11 10691-723

[70] Kim M, Jung J, Jung S, Moon Y H, Kim D-H and Kim J H 2019 Piezoresistive Behaviour of Additively Manufactured Multi-Walled Carbon Nanotube/Thermoplastic Polyurethane Nanocomposites *Materials* 12 2613

[71] El Shafee E, El Gamal M and Isa M 2012 Electrical properties of multi walled carbon nanotubes/poly (vinylidene fluoride/trifluoroethylene) nanocomposites *Journal of Polymer Research* 19 9805

[72] Sun H, Zhang H, Liu S, Ning N, Zhang L, Tian M and Wang Y 2018 Interfacial polarization and dielectric properties of aligned carbon nanotubes/polymer composites: The role of molecular polarity *Composites Science and Technology* 154 145-53.

FIG. 2. Schematic illustration of a TPU/CNT proximity sensor setup. (a) Distances ranging from 20 to 220 mm were applied by using a probing station (Keithley 4200-SCS, Tektronix, USA). The film was fixed over a glassy substrate to eliminate the noise and the sensing object (brass bar-10× 20×200 mm) approached the sample with a speed of 0.66 mm/s. To detect the maximum change in the capacitance, the samples were pre-soaked with 5V direct current (DC) to saturate and reduce the tunneling effect. Furthermore, a 30 mv alternate current (AC) swiping signal was applied to measure the capacitance of the film with varying frequencies. Negative change plot in capacitance showing sensitivity on RLC meter screen. (b) The sensor probes were mechanically semi-planner with an angle of 45 degree to reduce noise and the penetration depth inside the film. (c) Sensor being bent to show the thickness and the flexibility.

FIG. 3. Electrical field lines of proximity sensor and maximum sensitivity. a) Moving object at the farthest distance from sensor (i.e., 220 mm), no electrical field lines exist between probs and object. Bent electric filed lines (self-capacitance) are shown. b) Moving object at the closet distance to sensor (i.e., 20 mm), mutual capacitance becomes clear. Shunting of the initial electric lines causes very strong and scattered fringe field between object, film and probes, and capacitance drops radically. c) Maximum sensitivity comparison of different wt %. CNTs. Absolute percentage change of capacitance to the initial capacitance is plotted against distance.

FIG. 5a. Electrical conductivity and CNTs distribution a) Electrical conductivity of TPU/CNT samples vs. CNT content wt % are employed to do calculation of percolation threshold.

FIG. 1a-d SEM distribution images of cross-section fracture surface of the neat, 1 wt. %, 2 wt. % and 5 wt. % MWCNTs in TPU nanocomposite. White dots and lines are the carbon nanotubes within the polymer matrix.

FIG. 6. Sensor characterization with 2 wt %. CNT a) Nyquist stability plot of the impedance sensing to the magnetic field at different exciting frequencies. From EIS, the stable region of frequency response for imaginary and real are initiated around 500 kHz. b) Reproducibility response of sensors for three different coupons of similar manufacturing process. c) Repeatability response with several identical approaching cycles along with repeatable peaks. d) Relative change in capacitance of the sensor film under various bending radii of 20-80 mm. e) Mechanical flexibility of the tactile sensor—Relative change in capacitance measured for 400 bending/relaxing cycles at a bending radius of 20 mm.

FIG. 7. Schematic representation of simulation results of the basic fringe field cell a) A simple 3D model in Ansoft Maxwell along with implemented material properties, boundary conditions, vacuum domain, mesh and voltage distribution of sensor at closest proximity to the sensor (20 mm) inside a vacuum box b) Voltage distribution between two probes in range of 120 mm to 30 mm. Capacitance between two probes is mainly determined by fringe effects. c) Experimental and Maxwell simulation comparison of capacitance change as a function of distance.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

All publications, patents, and patent applications referenced herein are hereby incorporated by reference in their entirety for all purposes as if each publication, patent, or patent application had been individually indicated to be incorporated by reference.

The invention claimed is:

1. A sensor comprising:
    multiple layers of nanocomposite material, wherein each layer of nanocomposite material includes a thermoplastic polyurethane base and a plurality of carbon nanotubes embedded into the thermoplastic polyurethane base, wherein the multiple layers of nanocomposite material include a first layer of nanocomposite material having a first thickness and a second layer of nanocomposite material having a second thickness different from the first thickness, wherein the plurality of carbon nanotubes are present in the first layer of nanocomposite material in a first concentration by weight, and wherein the plurality of carbon nanotubes are present in the second layer of nanocomposite material in a second concentration by weight different from the first concentration by weight.

2. The sensor of claim 1, wherein each layer of nanocomposite material includes a plurality of epoxy resin fibers.

3. The sensor of claim 1, wherein the plurality of carbon nanotubes are present in each layer of the multiple layers of nanocomposite material in a concentration of from 1% by weight to 5% by weight per layer.

4. A sensor comprising:
    multiple layers of nanocomposite material, wherein each layer of nanocomposite material includes a thermoplastic polyurethane base and a plurality of carbon nanotubes embedded into the thermoplastic polyurethane base, wherein the multiple layers of nanocomposite material include a first layer of nanocomposite material having a first thickness and a second layer of nanocomposite material having a second thickness different from the first thickness, wherein the plurality of carbon nanotubes are present in the first layer of nanocomposite material in a first concentration by weight, and wherein the plurality of carbon nanotubes are present in the second layer of nanocomposite material in a second concentration by weight different from the first concentration by weight,
    wherein in use thereof, the sensor detects proximity of a sensed object over a distance of 220 mm with a resolution of 0.1 mm.

5. The sensor of claim 1, wherein the first layer of nanocomposite material has a first width and a first length and the second layer of nanocomposite material has a second width different from the first width and a second length different from the first length.

6. The sensor of claim 1, wherein the plurality of carbon nanotubes are present in the first layer of nanocomposite material in a concentration of 1% by weight, and wherein the plurality of carbon nanotubes are present in the second layer of nanocomposite material in a concentration of 2% by weight.

7. The sensor of claim 1, wherein the plurality of carbon nanotubes are present in the first layer of nanocomposite material in a concentration of 1% by weight, and wherein the plurality of carbon nanotubes are present in the second layer of nanocomposite material in a concentration of 3% by weight.

8. The sensor of claim 1, wherein the plurality of carbon nanotubes are present in the first layer of nanocomposite material in a concentration of 1% by weight, and wherein the plurality of carbon nanotubes are present in the second layer of nanocomposite material in a concentration of 4% by weight.

9. The sensor of claim 1, wherein the plurality of carbon nanotubes are present in the first layer of nanocomposite material in a concentration of 1% by weight, and wherein the plurality of carbon nanotubes are present in the second layer of nanocomposite material in a concentration of 5% by weight.

10. A method of producing a sensor, the method comprising:
    embedding a plurality of carbon nanotubes into a thermoplastic polyurethane base;
    diluting a concentration of the plurality of carbon nanotubes embedded into the thermoplastic polyurethane base to obtain a diluted concentration of carbon nanotubes that is from 1% by weight to 5% by weight; and
    processing the plurality of carbon nanotubes and the thermoplastic polyurethane base to obtain a plurality of processed nanocomposite layers,
    wherein processing the plurality of carbon nanotubes and the thermoplastic polyurethane base to obtain the plurality of processed nanocomposite layers includes obtaining a first processed nanocomposite layer in which the plurality of carbon nanotubes are present in a first concentration by weight and obtaining a second processed nanocomposite layer in which the plurality of carbon nanotubes are present in a second concentration by weight different from the first concentration by weight.

11. The method of claim 10, wherein processing the plurality of carbon nanotubes and the thermoplastic polyurethane base to obtain the plurality of processed nanocomposite layers comprises extruding the plurality of carbon nanotubes and the thermoplastic polyurethane base to obtain a plurality of nanocomposite filaments.

12. The method of claim 11, wherein processing the plurality of carbon nanotubes and the thermoplastic polyurethane base to obtain the plurality of processed nanocomposite layers comprises cutting the plurality of nanocomposite filaments to obtain a plurality of pellets.

13. The method of claim 12, wherein processing the plurality of carbon nanotubes and the thermoplastic polyurethane base to obtain the plurality of processed nanocomposite layers comprises compressing the pellets and heating the pellets to obtain the plurality of processed nanocomposite layers.

14. The method of claim 13, wherein at least one of the plurality of processed nanocomposite layers has a thickness from 0.5 mm to 0.7 mm.

15. The method of claim 13, wherein compressing the pellets and heating the pellets includes compressing the pellets in a hot press machine at 2.25 metric tons and heating the pellets gradually up to 200° C.

16. The method of claim 13, further comprising combining at least the first processed nanocomposite layer and the second processed nanocomposite layer to produce the sensor.

17. The method of claim 16, wherein the first processed nanocomposite layer and the second processed nanocomposite layer differ from one another in size and/or shape.

18. The method of claim 10, wherein the first concentration is 1% by weight and the second concentration is 2% by weight.

19. The method of claim 10, wherein the first concentration is 1% by weight and the second concentration is 3% by weight.

20. The method of claim 10, wherein the first concentration is 1% by weight and the second concentration is 4% by weight.

\* \* \* \* \*